United States Patent
Xia

(10) Patent No.: US 12,153,967 B2
(45) Date of Patent: Nov. 26, 2024

(54) CONTAINER SERVICE MANAGEMENT METHOD AND APPARATUS

(71) Applicant: Huawei Technologies Co., Ltd., Shenzhen (CN)

(72) Inventor: Haitao Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/825,833

(22) Filed: May 26, 2022

(65) Prior Publication Data

US 2022/0283872 A1 Sep. 8, 2022

Related U.S. Application Data

(63) Continuation of application No. 17/112,707, filed on Dec. 4, 2020, now Pat. No. 11,354,167, which is a
(Continued)

(30) Foreign Application Priority Data

Jun. 5, 2018 (CN) .......................... 201810570166.5

(51) Int. Cl.
 *G06F 9/50* (2006.01)
 *G06F 9/455* (2018.01)
(52) U.S. Cl.
 CPC ........ *G06F 9/5072* (2013.01); *G06F 9/45558* (2013.01); *G06F 9/5077* (2013.01);
 (Continued)
(58) Field of Classification Search
 CPC .................................................. G06F 9/5077
 See application file for complete search history.

(56) References Cited

U.S. PATENT DOCUMENTS 7,269,612 B2 * 9/2007 Devarakonda ........ G06F 16/221
  707/812
8,862,833 B2 * 10/2014 Noll ..................... G06F 3/0605
  711/170

(Continued)

FOREIGN PATENT DOCUMENTS

| CN | 105700961 A | 6/2016 |
| CN | 105760214 A | 7/2016 |

(Continued)

OTHER PUBLICATIONS

Quittek et al., "Network Functions Virtualization (NFV); Management and Ochestration", Dec. 2014, ETSI, ETSI GS NFV-MAN 001 v1.1.1, https://www.etsi.org/deliver/etsi_gs/NFV-MAN/001_099/001/01.01.01_60/gs_NFV-MAN001v010101p.pdf, all pages.*

(Continued)

*Primary Examiner* — Douglas B Blair
(74) *Attorney, Agent, or Firm* — Leydig, Voit & Mayer, Ltd.

(57) ABSTRACT

A container service management method and apparatus, to integrate a container service and a container service management function into an NFV MANO system. The method includes: receiving, by a container service management entity, a creation request for a container service, where the creation request is used to request to create a specified container service, and the creation request carries a first management policy for managing a lifecycle of the specified container service; creating, by the container service management entity, the specified container service in response to the creation request; and managing, by the container service management entity, the lifecycle of the specified container service according to the first management policy.

6 Claims, 14 Drawing Sheets

Related U.S. Application Data continuation of application No. PCT/CN2019/087725, filed on May 21, 2019.

(52) U.S. Cl.
CPC .............. *G06F 2009/45562* (2013.01); *G06F 2009/45595* (2013.01)

(56) References Cited

U.S. PATENT DOCUMENTS

| | | | | |
|---|---|---|---|---|
| 10,447,613 | B2* | 10/2019 | Brandwine | H04L 47/70 |
| 11,074,091 | B1* | 7/2021 | Nayakbomman | G06F 9/455 |
| 11,463,548 | B2* | 10/2022 | Wei | G06F 9/46 |
| 11,502,919 | B2* | 11/2022 | Xia | H04L 41/5041 |
| 11,611,481 | B2* | 3/2023 | Xia | H04L 41/0895 |
| 2014/0317293 | A1 | 10/2014 | Shatzkamer et al. | |
| 2016/0149771 | A1* | 5/2016 | Prasad | H04L 41/12 |
| | | | | 709/226 |
| 2016/0371063 | A1* | 12/2016 | Chiosi | H04L 41/40 |
| 2017/0048165 | A1 | 2/2017 | Yu et al. | |
| 2017/0257276 | A1 | 9/2017 | Chou et al. | |
| 2018/0276215 | A1* | 9/2018 | Chiba | H04L 67/51 |
| 2018/0316543 | A1* | 11/2018 | Hwang | H04L 41/5003 |
| 2018/0375734 | A1* | 12/2018 | Xia | H04L 41/0895 |
| 2019/0056975 | A1* | 2/2019 | Yu | H04L 41/40 |
| 2019/0058636 | A1* | 2/2019 | Xia | H04L 41/5041 |
| 2019/0146827 | A1* | 5/2019 | Yu | H04L 41/0816 |
| | | | | 709/226 |
| 2019/0179720 | A1* | 6/2019 | Chen | G06F 9/485 |
| 2019/0349258 | A1* | 11/2019 | Xia | H04L 41/0893 |
| 2020/0322232 | A1* | 10/2020 | Xia | H04L 41/5041 |
| 2021/0117241 | A1* | 4/2021 | Xia | G06F 9/5072 |
| 2021/0326167 | A1* | 10/2021 | Yang | G06F 9/5077 |

FOREIGN PATENT DOCUMENTS

| | | |
|---|---|---|
| CN | 105975330 A | 9/2016 |
| CN | 106375101 A | 2/2017 |
| CN | 107329799 A | 11/2017 |
| CN | 107332750 A | 11/2017 |
| CN | 107688322 A | 2/2018 |
| CN | 107908461 A | 4/2018 |
| CN | 107911430 A | 4/2018 |
| CN | 106464667 B | 1/2020 |
| CN | 107534577 B | 2/2020 |
| WO | 2017185303 A1 | 11/2017 |
| WO | 2018000197 A1 | 1/2018 |

OTHER PUBLICATIONS

U.S. Appl. No. 17/112,707, filed Dec. 4, 2020.
Xiao et al., "Study on Availability Model for NFV Systems," Mobile Communications, 1006-1010(2017)22-0051-06, pp. 51-56 (Jun. 30, 2017). With an English Abstract.
"Network Function Virtualization (NFV) Management and Orchestration," GS NFV-MAN 001 V0.6.3, pp. 1-197, ETSI (Sep. 2014).
"Architectural Proposal for the Handling of Network Operations Data with Specific Focus on Virtualized Networks," Version 1.0, pp. 1-25, Next Generation Mobile Networks Ltd. (Dec. 22, 2017).
"How to evaluate containerized VNF deployment in cloud-native NFV," SDNLAB, https://www.sdnlab.com/20687.html, with a machine translation, Total 19 pages (Apr. 2018).
Lee et al., "The Architecture of Generic VNFM using TOSCA," 2017 19th International Conference on Advanced Communication Technology (ICACT), pp. 81-84, Institute of Electrical and Electronics Engineers, New York, New York (Feb. 19-22, 2017).
Anonymous, "Management and Orchestration (MANO)-Iricent," XP055885288, total 2 pages (Apr. 3, 2018).
Anonymous, "Network function virtualization—Wikipedia," XP055885311, total 8 pages (May 28, 2018).

\* cited by examiner

CONTAINER SERVICE MANAGEMENT METHOD AND APPARATUS

CROSS-REFERENCE TO RELATED APPLICATIONS

This application is a continuation of U.S. patent application Ser. No. 17/112,707, filed on Dec. 4, 2020, which is a continuation of International Application No. PCT/CN2019/087725, filed on May 21, 2019. The International Application claims priority to Chinese Patent Application No. 201810570166.5, filed on Jun. 5, 2018. All of the aforementioned patent applications are hereby incorporated by reference in their entireties.

TECHNICAL FIELD

This application relates to the field of container services, and in particular, to a container service management method and apparatus.

BACKGROUND

Network functions virtualisation (NFV) provides a brand-new approach to design, deploy, and manage network services (NS). The NFV technology decouples software from hardware for implementation of some telecom network functions in a general-purpose server, a general-purpose switch, and a general-purpose memory, so that the NSs can be quickly and efficiently deployed. The NFV requires a large quantity of virtualised resources, and therefore, high-level software management, which is referred to as orchestration in the industry, is required. Network function virtualisation management and orchestration (NFV MANO) is an architectural framework used to perform management and coordination on a virtualised network function (VNF) and other software components.

Recently, with continuous development of NFV technologies, new features are incorporated into presentation forms of a virtual machine (VM)—based VNF at a network function virtualisation infrastructure (NFVI) layer, and a cloud-based architecture that supports a cloud-native VNF and that integrates a platform as a service (PaaS) becomes a new trend of telecom cloud development. As conventional telecom network functions are migrated to a cloud through containerization and servitization, and new forms of network functions are directly developed and delivered on the cloud, an inevitable problem is how to integrate functions for managing container services into a management framework of an NFV MANO system. However, in the prior art, there is no mechanism for integrating the functions for managing container services into the NFV MANO system.

SUMMARY

This application provides a container service management method and apparatus, to integrate a container service and a container service management function into an NFV MANO system.

According to a first aspect, this application provides a container service management method. The method includes: A container service management entity receives a creation request for a container service, where the creation request is used to request to create a specified container service, and the creation request carries a first management policy for managing a lifecycle of the specified container service; the container service management entity creates the specified container service in response to the creation request; and the container service management entity manages the lifecycle of the specified container service according to the first management policy.

Herein, the container service corresponds to a CaaS (Container as a service), and the container service management entity corresponds to a CaaS manager in this specification of this application.

With reference to the first aspect, in some embodiments of the first aspect, the method further includes: The container service management entity receives a deletion request for a container service, where the deletion request is used to request to delete the specified container service, and the deletion request carries identification information of the specified container service; and the container service management entity deletes the specified container service based on the identification information of the specified container service.

It should be understood that the deletion request for a container service definitely exists after the container service is created. In other words, a request for deleting a container service exists only if the container service exists.

With reference to the first aspect, in some embodiments of the first aspect, when a container service and a container service management function are deployed in a central data center, that the container service management entity receives a creation request for a container service includes: The container service management entity receives the creation request from a virtualised network function manager VNFM; and that the container service management entity receives a deletion request for a container service includes: The container service management entity receives the deletion request from the VNFM.

With reference to the first aspect, in some embodiments of the first aspect, when a container service and a container service management function are deployed in an edge data center, that the container service management entity receives a creation request for a container service includes: The container service management entity receives the creation request from a network functions virtualisation orchestrator NFVO; and that the container service management entity receives a deletion request for a container service includes: The container service management entity receives the deletion request from the NFVO.

In other words, when the container service management function is deployed in the central data center, the NFVO in an NFV MANO system is used as an anchor entity that the container service management function accesses the NFV MANO system. When the container service management function is deployed in the edge data center, the VNFM in the NFV MANO system is used as an anchor entity that the container service management function accesses the NFV MANO system.

With reference to the first aspect, in some embodiments of the first aspect, container service management includes management for a lifecycle of a container application and management for a container resource that constitutes a container service; and that the container service management entity manages the lifecycle of the specified container service according to the first management policy includes: The container service management entity manages, according to the first management policy, the lifecycle of the container application and a container resource that constitutes the specified container service.

In an existing NFV MANO system, a VNFM and a VIM respectively manage a lifecycle of a VNF and a virtual resource required by the VNF. Consequently, an operation of managing the lifecycle of the VNF is time-consuming, and this cannot adapt to a requirement for fast iteration and update of a VNF function. However, in this embodiment of this application, the container service management includes management for a lifecycle of an application encapsulated in a container and management for a container resource. In addition, a same management entity (the CaaS manager) manages the lifecycle of the container application and the container resource. Therefore, this can adapt to the requirement for fast iteration and update of the VNF function.

According to a second aspect, this application provides a container service management method. The method includes: A virtualised network function manager VNFM obtains a second management policy for managing a lifecycle of a specified containerized virtualised network function VNF; the VNFM generates, according to the second management policy, a first management policy for managing a lifecycle of a specified container service, where the specified containerized VNF is constituted by the specified container service; and the VNFM sends the first management policy to a container service management entity, so that the container service management entity manages the lifecycle of the specified container service according to the first management policy.

Herein, the container service management entity corresponds to a CaaS (Container as a service) manager in this specification of this application, and the container service corresponds to a CaaS in this specification.

In addition, the method in the second aspect is applicable to a scenario in which a container service and a container service management function are deployed in a central data center.

With reference to the second aspect, in some embodiments of the second aspect, the second management policy does not include a management policy for instantiating a containerized VNF, and that a VNFM obtains a second management policy for managing a lifecycle of a specified containerized VNF includes: The VNFM receives an instantiation request for a containerized VNF from a network functions virtualisation orchestrator NFVO or an element management EM system, where the instantiation request is used to request to instantiate the specified containerized VNF, and the instantiation request carries the second management policy; and the VNFM obtains the second management policy from the instantiation request.

With reference to the second aspect, in some embodiments of the second aspect, that the VNFM sends the first management policy to a container service management entity includes: The VNFM sends a creation request for a container service to the container service management entity, where the creation request is used to request to create the specified container service, and the creation request carries the first management policy.

With reference to the second aspect, in some embodiments of the second aspect, the second management policy does not include a management policy for terminating a containerized VNF instance; and the method further includes: The VNFM receives a termination request for a containerized VNF instance from the NFVO, where the termination request is used to request to terminate an instance of the specified containerized VNF, and the termination request carries identification information of the instance of the specified containerized VNF; and the VNFM sends a deletion request for a container service to the container service management entity in response to the termination request.

According to a third aspect, this application provides a container service management method. The method includes: A network functions virtualisation orchestrator NFVO generates a first management policy for managing a lifecycle of a specified container service, or an NFVO generates a second management policy for managing a lifecycle of a specified containerized virtualised network function VNF, where the specified containerized VNF is constituted by the specified container service; and when the NFVO generates the first management policy, the NFVO sends the first management policy to a container service management entity, or when the NFVO generates the second management policy, the NFVO sends the second management policy to a virtualised network function manager VNFM.

Herein, the container service corresponds to a CaaS (Container as a service) in this specification, and the container service management entity corresponds to a CaaS manager in this specification of this application.

For example, the case in which the NFVO generates the second management policy is applicable to a scenario in which a container service and a container service management function are deployed in a central data center. The case in which the NFVO generates the first management policy is applicable to a scenario in which a container service and a container service management function are deployed in an edge data center. In other words, when the container service and the container service management function are deployed in the central data center, the NFVO generates the second management policy, and sends the second management policy to the VNFM. When the container service and the container service management function are deployed in the edge data center, the NFVO generates the first management policy, and directly sends the first management policy to the container service management entity (the CaaS manager). The NFVO can learn whether the container service and the container service management function are deployed in the central data center or the edge data center. For example, during networking, the NFVO can learn of deployment of the container service and the container service management function, where the deployment includes whether the container service and the container service management function are specifically deployed in the central DC or the edge DC.

With reference to the third aspect, in some embodiments of the third aspect, that the NFVO sends the first management policy to a container service management entity includes: The NFVO sends a creation request for a container service to the container service management entity, where the creation request carries the first management policy.

With reference to the third aspect, in some embodiments of the third aspect, the method further includes: The NFVO sends a deletion request for a container service to the container service management entity, where the deletion request is used to request to delete the specified container service, and the deletion request carries identification information of the specified container service.

With reference to the third aspect, in some embodiments of the third aspect, when the NFVO generates the second management policy, the second management policy does not include a management policy for instantiating a containerized VNF; and that NFVO sends the second management policy to a VNFM includes: The NFVO sends an instantiation request for a containerized VNF to the VNFM, where the instantiation request is used to request to instantiate the specified containerized VNF, and the instantiation request carries the second management policy.

With reference to the third aspect, in some embodiments of the third aspect, the second management policy does not include a management policy for terminating a containerized VNF instance; and the method further includes: The NFVO sends a termination request for a containerized VNF instance to the VNFM, where the termination request is used to request to terminate an instance of the specified containerized VNF, and the termination request carries identification information of the instance of the specified containerized VNF.

According to a fourth aspect, this application provides a container service management apparatus, configured to perform the method according to any one of the first aspect or the embodiments of the first aspect. Specifically, the apparatus includes units that perform the method according to any one of the first aspect or the embodiments of the first aspect.

According to a fifth aspect, this application provides a container service management apparatus, configured to perform the method according to any one of the second aspect or the embodiments of the second aspect. Specifically, the apparatus includes units that perform the method according to any one of the second aspect or the embodiments of the second aspect.

According to a sixth aspect, this application provides a container service management apparatus, configured to perform the method according to any one of the third aspect or the embodiments of the third aspect. Specifically, the apparatus includes units that perform the method according to any one of the third aspect or the embodiments of the third aspect.

According to a seventh aspect, this application provides a computer-readable storage medium. The computer-readable storage medium stores a computer instruction, and when the computer instruction is run on a computer, the computer is enabled to perform the method according to any one of the first aspect or the embodiments of the first aspect.

According to an eighth aspect, this application provides a computer-readable storage medium. The computer-readable storage medium stores a computer instruction, and when the computer instruction is run on a computer, the computer is enabled to perform the method according to any one of the second aspect or the embodiments of the second aspect.

According to a ninth aspect, this application provides a computer-readable storage medium. The computer-readable storage medium stores a computer instruction, and when the computer instruction is run on a computer, the computer is enabled to perform the method according to any one of the third aspect or the embodiments of the third aspect.

According to a tenth aspect, this application provides a chip, including a memory and a processor. The memory is configured to store a computer program, and the processor is configured to invoke the computer program from the memory and run the computer program, so that a network device in which the chip is installed performs the method according to any one of the first aspect or the embodiments of the first aspect.

According to an eleventh aspect, this application provides a chip, including a memory and a processor. The memory is configured to store a computer program, and the processor is configured to invoke the computer program from the memory and run the computer program, so that a network device in which the chip is installed performs the method according to any one of the second aspect or the embodiments of the second aspect.

According to a twelfth aspect, this application provides a chip, including a memory and a processor. The memory is configured to store a computer program, and the processor is configured to invoke the computer program from the memory and run the computer program, so that a network device in which the chip is installed performs the method according to any one of the third aspect or the embodiments of the third aspect.

According to a thirteenth aspect, this application provides a computer program product. The computer program product includes computer program code. When the computer program code is run on a computer, the computer is enabled to perform the method according to any one of the first aspect or the embodiments of the first aspect.

According to a fourteenth aspect, this application provides a computer program product. The computer program product includes computer program code. When the computer program code is run on a computer, the computer is enabled to perform the method according to any one of the second aspect or the embodiments of the second aspect.

According to a fifteenth aspect, this application provides a computer program product. The computer program product includes computer program code. When the computer program code is run on a computer, the computer is enabled to perform the method according to any one of the third aspect or the embodiments of the third aspect.

According to a sixteenth aspect, this application provides a network device, including a transceiver, a processor, and a memory. The processor is configured to control the transceiver to send and receive a signal, the memory is configured to store a computer program, and the processor is configured to invoke and run the computer program stored in the memory, so that the network device performs the method according to any one of the first aspect or the embodiments of the first aspect.

According to a seventeenth aspect, this application provides a network device, including a transceiver, a processor, and a memory. The processor is configured to control the transceiver to send and receive a signal, the memory is configured to store a computer program, and the processor is configured to invoke and run the computer program stored in the memory, so that the network device performs the method according to any one of the second aspect or the embodiments of the second aspect.

According to an eighteenth aspect, this application provides a network device, including a transceiver, a processor, and a memory. The processor is configured to control the transceiver to send and receive a signal, the memory is configured to store a computer program, and the processor is configured to invoke and run the computer program stored in the memory, so that the network device performs the method according to any one of the third aspect or the embodiments of the third aspect.

According to a nineteenth aspect, this application provides a container service management system. The system includes the container service management entity according to any one of the first aspect or the embodiments of the first aspect, the VNFM according to any one of the second aspect or the embodiments of the second aspect, and/or the NFVO according to any one of the third aspect or the embodiments of the third aspect.

According to the technical solutions provided in this application, the VNFM or the NFVO in the NFV MANO system is used as an anchor entity that the container service management function accesses the NFV MANO system. In this way, the container service and the container service management function can be integrated into the NFV MANO system in the central data center or the edge data center.

DESCRIPTION OF EMBODIMENTS

The following describes the technical solutions of this application with reference to the accompanying drawings.

Figure 1:
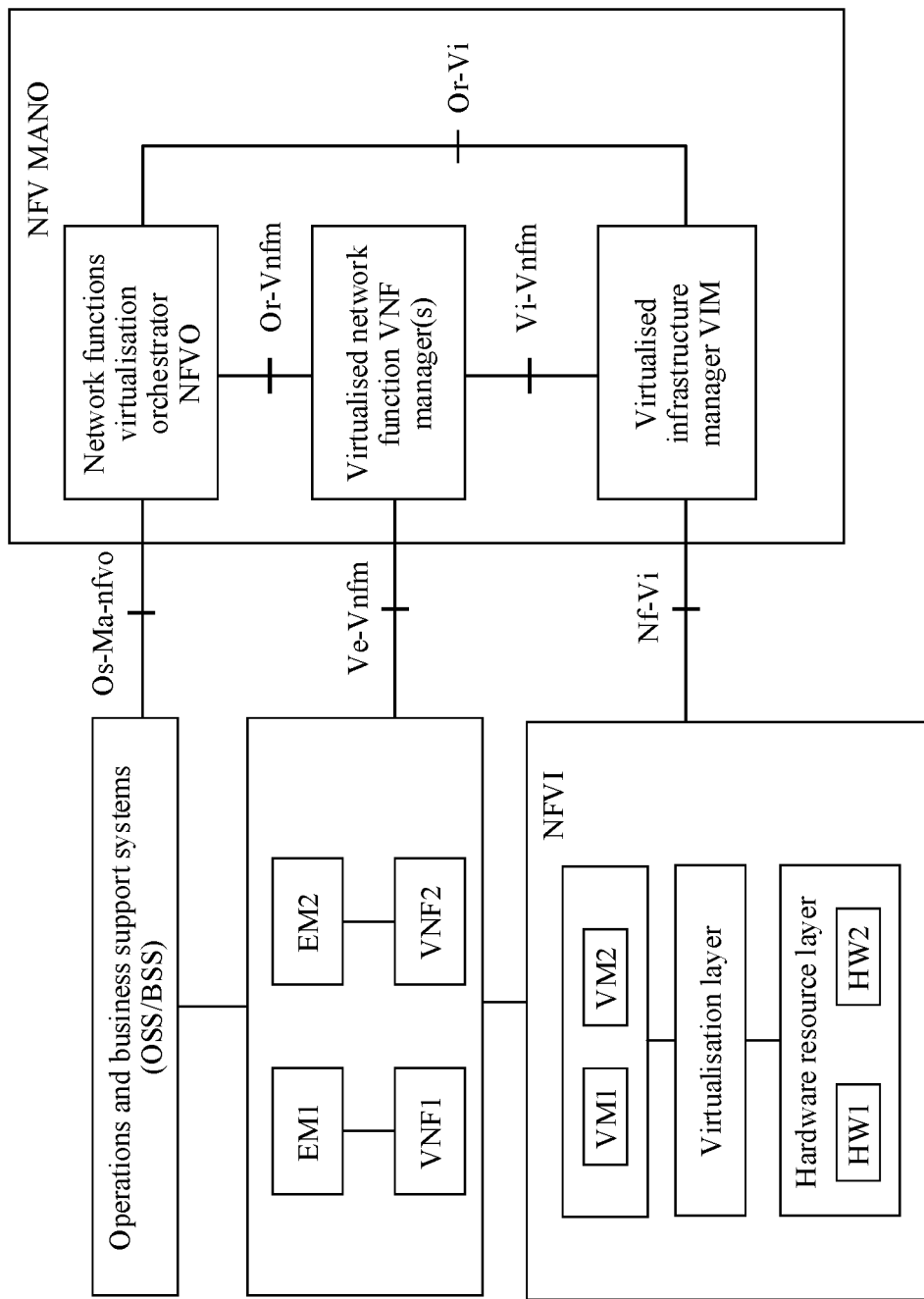
FIG. 1 is an architectural diagram of an NFV MANO system.

FIG. 1 is an architectural diagram of an NFV MANO system. As shown in FIG. 1, the NFV MANO has three main functional blocks: an NFV orchestrator, a VNF manager, and a virtualised infrastructure manager (VIM). Briefly, the NFV orchestrator can orchestrate services and resources, and control new network services, and integrate a VNF into a virtual architecture. The NFV orchestrator can further verify and authorize an NFV infrastructure resource request. The VNF manager can manage a lifecycle of a VNF. The VIM can control and manage an NFV infrastructure, including compute resources, storage resources, network resources, and the like. To enable the NFV MANO to work effectively, the NFV MANO needs to be integrated with an application programming interface (API) in an existing system, to use technologies of a plurality of vendors across a plurality of network domains. Likewise, interoperations between the NFV MANO system and an operations support system (OSS) and a business support system (BSS) also need to be implemented.

For ease of understanding, the following describes functions of the components related to the architecture shown in FIG. 1.

The network functions virtualisation orchestrator (NFVO) is configured to manage and process a network service descriptor (NSD) and a virtual network function forwarding graph (VNFFG), manage a lifecycle of a network service, and collaborate with a virtualised network function manager (VNFM), to manage a lifecycle of a virtualised network function (VNF) and provide a global view of virtual resources.

The VNFM is configured to manage a lifecycle of a VNF, including managing a VNF descriptor (VNFD), instantiating the VNF, performing auto scaling (for example, scaling out/up and/or scaling in/down) on a VNF instance, healing the VNF instance, and terminating the VNF instance. The VNFM also supports receiving of an auto scaling policy delivered by the NFVO, to automatically implement auto scaling for the VNF.

The virtualised infrastructure manager (VIM) is mainly responsible for managing (including reserving and allocating) hardware resources and virtualised resources at an infrastructure layer, monitoring statuses of the virtualised resources, reporting a fault, and providing a virtualised resource pool for an upper-layer application.

Operations and business support systems (OSS/BSS) are existing operation and maintenance systems of an operator.

An element manager (EM) system performs conventional functions of fault management, configuration management, account management, performance management, and security management (FCAPS) for a VNF.

The virtualised network function (VNF) corresponds to a physical network function (PNF) in a conventional non-virtualised network, for example, a mobility management entity (MME), a service gateway (SGW), or a packet data network gateway (PGW) in a virtualised evolved packet core (EPC). Functional behavior and a status of a network function are unrelated to virtualisation of the network function. NFV technologies require that the VNF and the PNF have same functional behavior and a same external interface. The VNF may include one or more lower function level VNF components (VNFC). Therefore, one VNF may be deployed on a plurality of virtual machines (VM), and each VM bears a function of one VNFC. One VNF may alternatively be deployed on one VM.

The NFV infrastructure (NFVI) includes hardware resources, virtual resources, and virtualisation layers. From a perspective of the VNF, virtualisation layers and hardware resources are considered as an entirety that can provide required virtual resources.

With continuous development of the NFV technologies, new features are incorporated into presentation forms of a VM-based VNF at an NFVI layer, and a cloud-based architecture that supports a cloud native VNF and that integrates a platform as a service (PaaS) becomes a new trend of telecom cloud development.

In the field of information technologies (IT), cloud native is an approach that utilizes advantages of a cloud computing delivery model to build and run an application. Instead of focusing on capital investments and employees to run enterprise data centers, cloud computing provides limitless on-demand computing capabilities and pay-per-use capabilities, and therefore, cloud computing redefines a competitive landscape of almost all industries. Enterprises require a platform for building and operating cloud native applications and services, to automate and integrate concepts of DevOps, continuous delivery, microservices, and containers.

A PaaS is a business model that uses a server platform function as a service. A service that provides a network-based software program is referred to as software as a service (SaaS). In a cloud computing era, a cloud computing platform or a cloud computing development environment that provides a service is referred to as a PaaS. In typical cloud computing levels, a PaaS layer is located between a SaaS layer and an infrastructure as a service (IaaS) layer. A typical PaaS platform provides the following functions: (1) providing an application running environment, including a distributed computing running environment, various types of data storage, a dynamic resource scaling function, supporting of an application lifecycle (including providing of integrated drive electronics (IDE) and software development kit ( ) that are used to accelerate development, testing, and deployment of applications); (2) providing, through application programming interfaces (API), public services (for example, queue services, storage services, and cache services), monitoring, management, and metering; and managing and monitoring resource pools and an application system, and providing accurate metering; and (3) integrating and composing application building capabilities, including connectivity services, integration services, message services, and process services.

A container as a service (cCaaS) is a specific type of PaaS. Generally, a container is an operating system-level virtualisation technology. The container isolates different processes by using an operating system isolation technology, for example, a control group (Cgroup) and a namespace (Namespace) in Linux. A difference from a hardware virtualisation (hypervisor) technology lies in that, in a container technology, there is no virtual hardware, and there is no operating system but a process inside a container. By virtue of this characteristic of the container technology, a container is more lightweight and easier to manage in comparison with a virtual machine. A group of common management operations such as starting, stopping, pausing, and deleting are defined for running statuses of a container, so that a lifecycle of the container can be centrally managed. A container-as-a-service architecture introduced to a cloudification process of telecom network functions brings agile transformation to development and operation and maintenance of the telecom industry. Accordingly, conventional large granular monolithic network functions are gradually deconstructed and further servitized into microservices. Each servitized function is independently developed, delivered, and maintained.

For descriptions about interfaces (for example, Os-Ma-nfvo, Ve-vnfm, Nf-Vi, Or-Vnfm, Vi-Vnfm, and Or-Vi) between components and/or management entities shown in FIG. 1, refer to descriptions about interfaces in an NFV MANO system in the prior art. Details are not described in this specification.

Figure 2:
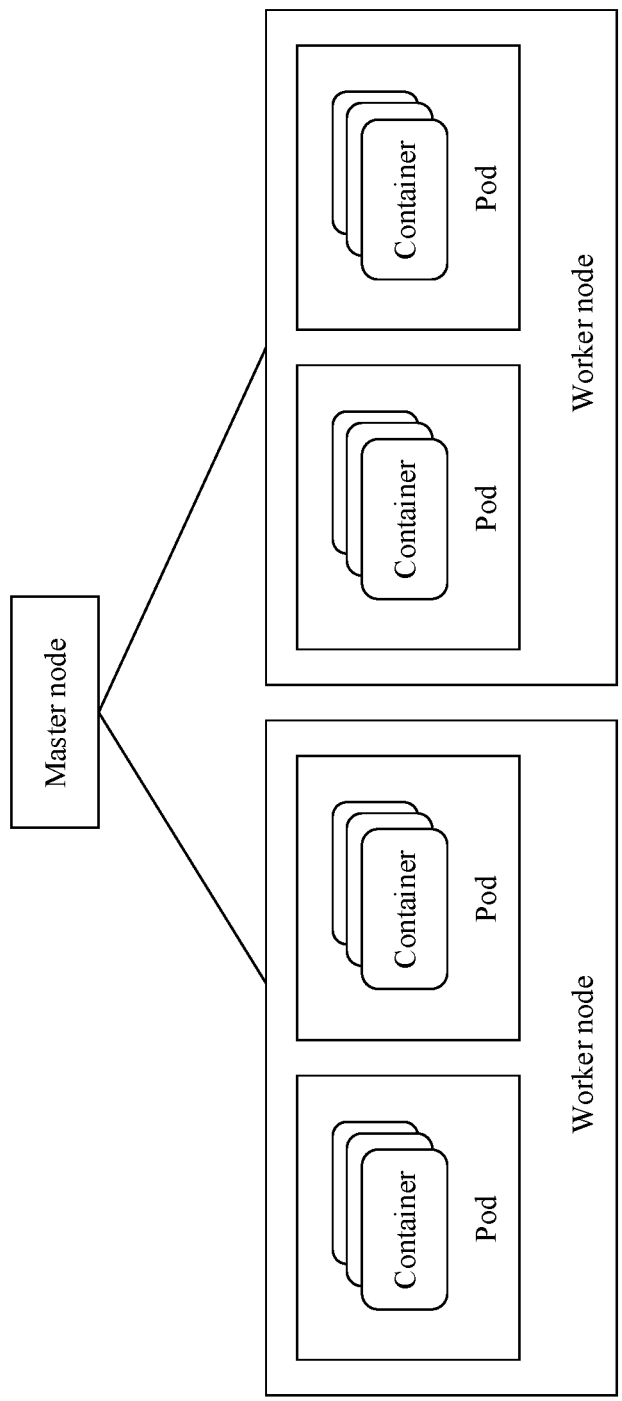
FIG. 2 is an architectural diagram of a management and orchestration system of a container service.

FIG. 2 is an architectural diagram of a management and orchestration system of a container service. Specifically, FIG. 2 shows an open-source Kubernetes container cluster management system developed by Google Inc. Kubernetes holds a core idea that everything is service-centered and service-focused. Therefore, containerized applications created on Kubernetes can run on physical machines, virtual machines, or enterprise private clouds, and can also be hosted on public clouds. Kubernetes also features automation, self-scaling up/down, self-diagnosis, and easy upgrade. Based on Docker technologies, Kubernetes provides a series of complete functions such as deployment and running, resource scheduling, service discovery, and dynamic scaling for containerized applications. As shown in FIG. 2, a Kubernetes system includes a master node (Master) and a group of worker nodes (Node). The master node is a cluster master node on which a group of cluster management-related processes are run. The master node is responsible for management and control for a whole cluster, to implement container management. The worker node is a service node on which a pod (Pod) runs in the Kubernetes system, and is a host on which the pod runs. One pod (Pod) may include one container or a plurality of related containers. The pod is a smallest unit for creation, scheduling, management in the Kubernetes system. Containers included in the pod run on a same host, and use a same network namespace and a same internet protocol (IP) address. The pod provides higher-level abstract than a container, so that deployment and management are more flexible. The Kubernetes system is a distributed container management system in which containers are independently managed and orchestrated, and management for lifecycles of the containers is implemented (through interaction between the master node and the worker node) in the Kubernetes system.

It can be learned from the foregoing descriptions about the NFV MANO system and the Kubernetes system that, a significant difference lies in that central management is performed in the NFV MANO system. To be specific, monitored operation and maintenance data such as performance and alarm data at both a virtual resource layer and a VNF function layer is gathered on an NFVO for management. The NFVO manages a global resource view in a domain, NS/VNF function composition, and a dependency relationship or an association relationship between VNFs included in an NS. The NFVO makes a corresponding decision based on such information, and dispatches the decision to a corresponding management entity (for example, a VNFM or a VIM) for execution. The NFV MANO system with these characteristics is quite different from the Kubernetes system with a strong autonomous management capability. Under a new trend or with a requirement for integrating a function for managing container services into the NFV MANO system, how to make a balance between the two types of systems in different management modes (a centralized management mode and a distributed management mode), to implement seamless integration and operation becomes an urgent problem to be considered.

In view of this, this application provides a container service management method, to integrate a container service and a container service management function into an NFV MANO system.

The following describes the container service management method provided in this application.

In consideration of a difference between a scenario in which a container service is deployed in an operator's central data center (DC) and a scenario in which a container service is deployed in an operator's edge data center, this application provides different integrated architectures for the central DC (also referred to as a central cloud) and the edge DC (also referred to as an edge cloud). The following separately provides descriptions about the architectures.

1. Integrated Architecture Applicable to a Central DC

Figure 3:
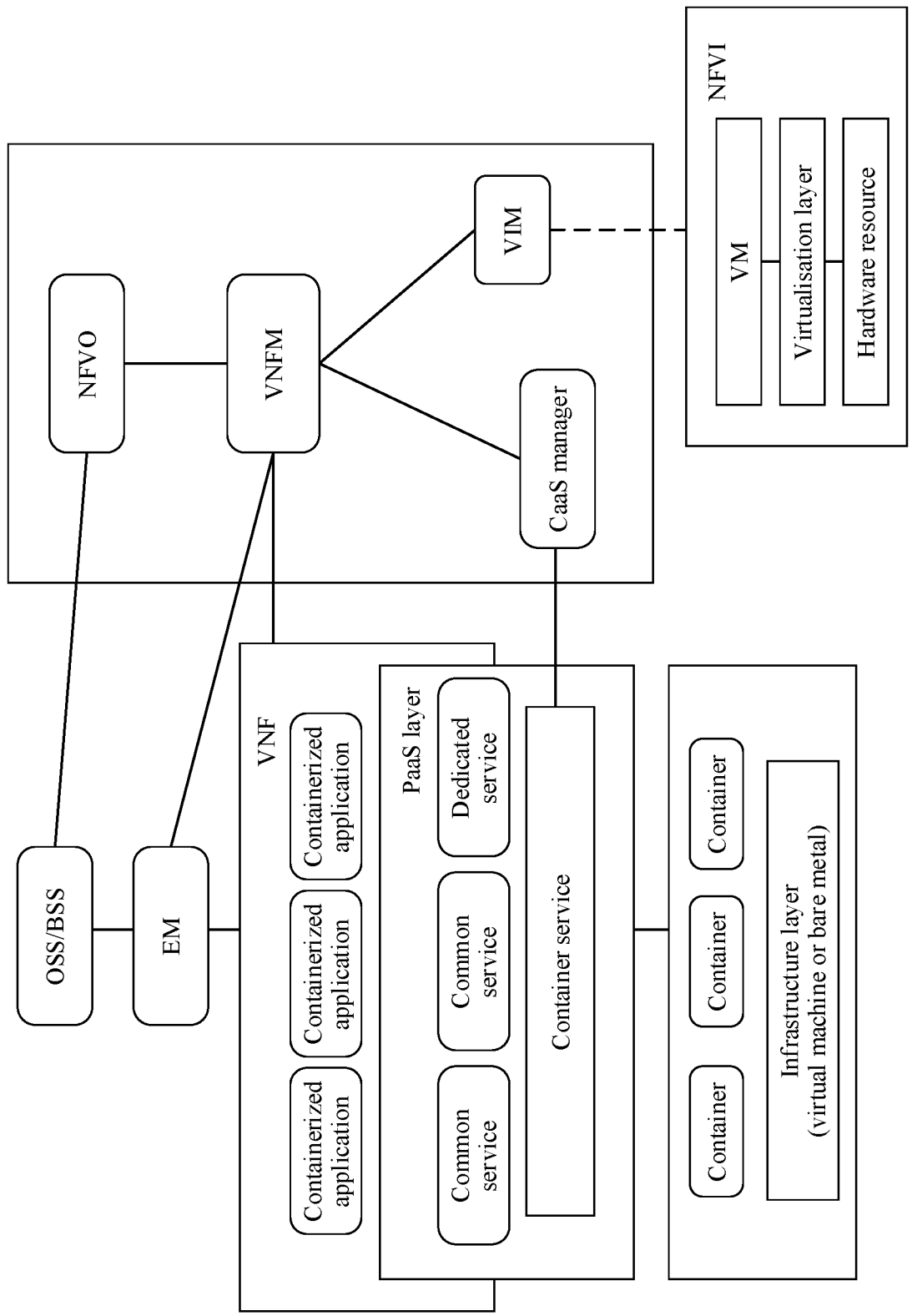
FIG. 3 is a schematic diagram of a network architecture according to this application.

FIG. 3 shows the integrated architecture applicable to the central DC according to this application. A design idea of the integrated architecture is to add a container service management entity into an NFV MANO architecture. A name of the container service management entity is not specifically limited in this application. For example, the container service management entity may be referred to as a CaaS manager (CaaS Mgt), or may have another name. In the following embodiments, that the container service management entity is referred to as a CaaS manager is merely used as an example to describe functions of the container service management entity. As shown in FIG. 3, the CaaS manager is responsible for performing functions of a CaaS management plane, and is mainly responsible for managing and orchestrating a CaaS (that is, a container service). The CaaS is deployed on a VNF side, and is used as a sublayer of a VNF PaaS layer. The container service may be invoked by a VNF or a common service or a dedicated service at the PaaS layer. The CaaS is an integration of container applications at the PaaS layer and container resources at an IaaS layer. Therefore, management for the CaaS by the CaaS manager may be further divided into management for lifecycles of container applications and management for container resources. The two functions are coupled together in the container service management method provided in this application. However, in an existing NFV MANO architecture, management for lifecycles of VNFs and management for virtual resources are separated from each other, and the lifecycles and the virtual resources need to be respectively managed through a VNFM and a VIM at different layers. As shown in FIG. 1, the VNFM manages a lifecycle of a VNF, and the VIM manages an NFVI layer.

It should be noted that the common service or the dedicated service at the PaaS layer may be included in a VNFC. The common service, the dedicated service, and a container application constitute a VNF in a multi-vendor interoperability scenario. The CaaS is located at the bottom of the PaaS layer. The CaaS integrates service capabilities of the PaaS layer and the IaaS layer and is abstracted as a platform service at the PaaS layer based on container resource management at the IaaS layer. The CaaS is different from other services at the PaaS layer. The CaaS may be separated from the VNF and is used as an independent manageable object, and may be invoked by container applications or VNFs of different vendors through a standardized application programming interface (application programming interface, API).

Figure 4:
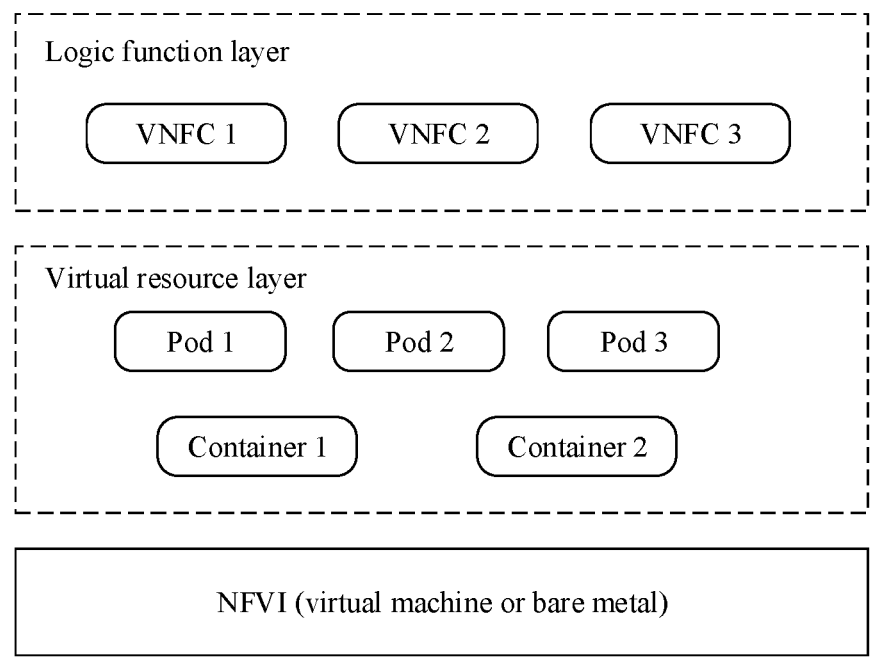
FIG. 4 shows composition of a containerized VNF according to this application.

The following describes composition of a containerized VNF with reference to FIG. 4.

FIG. 4 shows composition of the containerized VNF according to this application. As shown in FIG. 4, the containerized VNF mainly includes a logical function layer, a virtual resource layer, and an NFVI layer. At the logical function layer of the VNF, one VNF instance includes one or more VNFC instances. One VNFC may be mapped as one container application on a container service management platform and mapped as one pod (Pod) or one container (Container) at the virtual resource layer.

It should be noted that the containerized VNF in the embodiments of this application is different from a VNF in an existing NFV MANO system. The containerized VNF is a VNF created on a container, while an existing VNF is created on a virtual machine. In the following embodiments, the VNF refers to the existing VNF created on the virtual machine, and the containerized VNF refers to the VNF that is created on the container and that is provided in this application.

It should be noted that the embodiments of this application are based on the following assumption. To be specific, a node (including a virtual machine and/or a bare metal) resource pool of a container resource used by the virtual resource layer of the containerized VNF is isolated from a node resource pool based on a virtual machine in the NFV MANO system. Isolation between the node resource pools can ensure that each system can focus on its own characteristics to run at an initial stage of integration between a container service management system and the NFV MANO system, so that an integrated system is more stable and reliable, with no need to consider how to maximally increase resource utilization in an environment with limited resources. With reference to the integrated architecture shown in FIG. 3, the CaaS manager and the NFV MANO system have their respective node resource pools. As shown in FIG. 3, a node resource pool for a container service management function is managed by the CaaS manager, where a virtual machine and/or a bare metal are/is included. The node resource pool of the NFV MANO system is still managed by the VIM.

Interaction between the CaaS manager and a CaaS user plane shown in FIG. 3 may be the same as interaction performed on an existing container management platform. For example, the interaction between the CaaS manager and the CaaS user plane may be performed by using the open-source Kubernetes shown in FIG. 2 as a de facto standard. This is similar to a case in which interaction is performed by using OpenStack as a VIM de facto standard. Therefore, integration between the NFV MANO architecture and a container management platform mainly focuses on a northbound interface of the CaaS manager. In other words, the integration focuses on how to integrate the container service management function into the NFV MANO architecture through the CaaS manager. The following provides description with reference to embodiments of FIG. 5 to FIG. 7.

Figure 5:
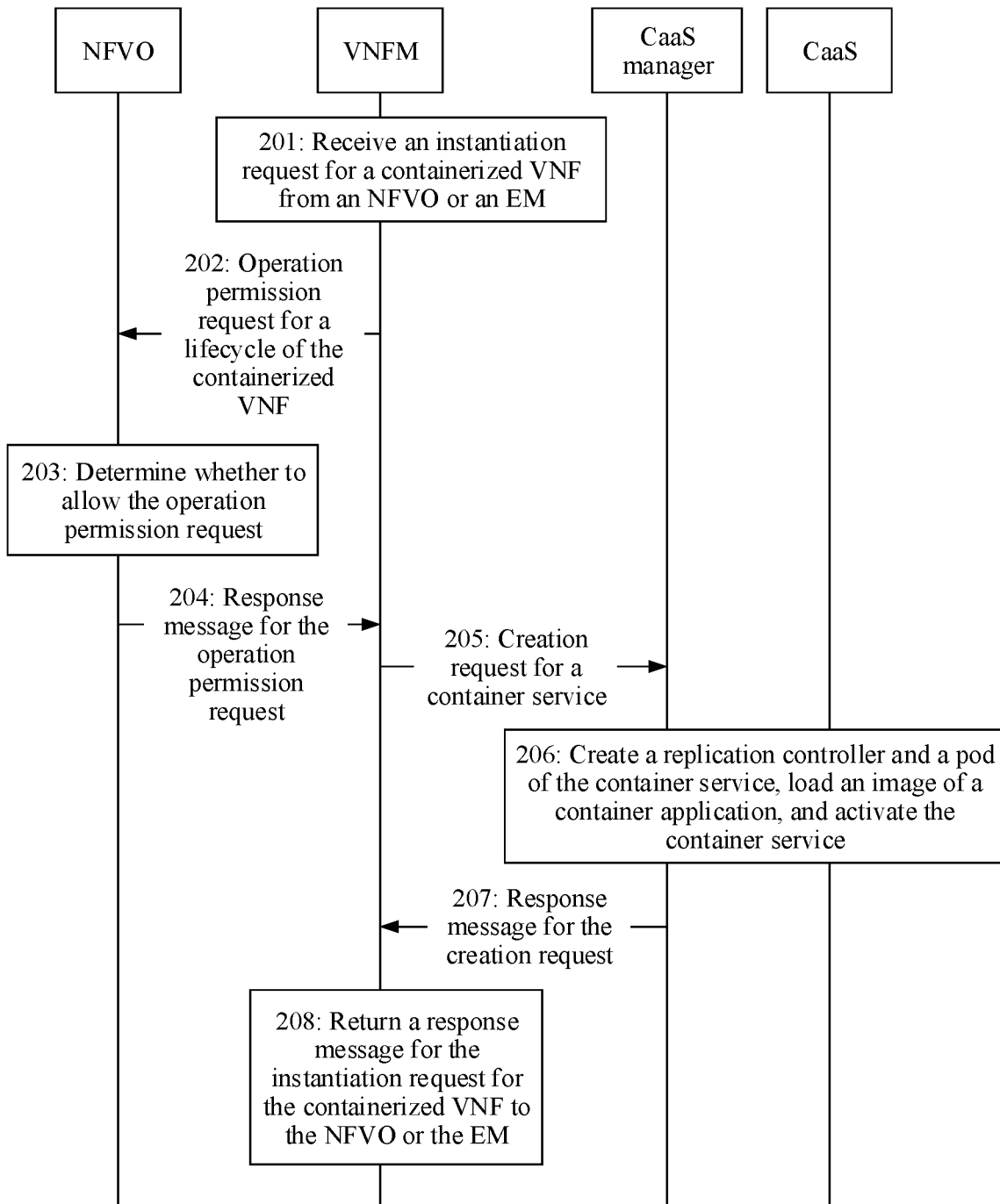
FIG. 5 shows an example of creating a container service by using a container service management method according to this application.

FIG. 5 shows an example of creating a container service by using a container service management method according to this application. Specifically, a CaaS manager and an NFV MANO system are both deployed in an operator's central DC. A VNF and a containerized VNF are deployed in a same DC. The CaaS manager uses a VNFM as an anchor entity to access the NFV MANO system. For different network functions (for example, a VNF and a containerized VNF), the VNFM, as a node that gathers all management for a lifecycle of a VNF instance, dispatches a command for managing a lifecycle of a CaaS to the CaaS manager, or the VNFM terminates the lifecycle of a CaaS. The VNFM further initiates, to a VIM, a process of allocating a VM-based virtual resource required for managing a lifecycle of a VNF instance.

201: The VNFM receives an instantiation request message for a containerized VNF from an NFVO or an EM.

The instantiation request message is used to request to instantiate one (or more) specified containerized VNF(s). The instantiation request message carries a lifecycle management policy for a specified containerized VNF instance. The lifecycle management policy for the containerized VNF instance is used to manage a lifecycle of an instantiated specified containerized VNF. It should be understood that the containerized VNF instance is an instance of the containerized VNF.

The lifecycle management policy for the containerized VNF instance includes but is not limited to a scaling operation policy, a healing operation policy, a resource constraint policy, and the like. The scaling operation policy may include a threshold for monitoring performance metrics (PM) of a scaling operation performed on a container service. Different thresholds, for example, different types of scaling operations and different steps of scaling operations, may be used to trigger different scaling operations. A scaling operation type includes scaling out/up or scaling in/down. The healing operation policy may include, for example, performing a healing operation based on a monitoring event of a container service scaling operation. The resource constraint policy may include an affinity and/or anti-affinity requirement for a scheduled resource in a container service scaling operation and/or a container service healing operation.

Optionally, the NFVO or the EM may encapsulate the lifecycle management policy for the containerized VNF instance into the instantiation request message of the containerized VNF, and transmit, to the VNFM, the lifecycle management policy for the containerized VNF instance. Alternatively, the NFVO or the EM may transmit the lifecycle management policy for the containerized VNF instance to the VNFM through an individual file.

In step 201, the NFVO or the EM transfers the lifecycle management policy for the containerized VNF instance to the VNFM through an instantiation process of the containerized VNF. Actually, in other words, in the foregoing interaction process, only the instantiation process of the containerized VNF is retained in lifecycle management for the containerized VNF.

202: The VNFM sends an operation permission request for a lifecycle of the containerized VNF to the NFVO.

The operation permission request for the lifecycle of the containerized VNF carries identification information of the containerized VNF instance and the lifecycle management policy for the containerized VNF instance.

203: The NFVO determines whether to allow the permission operation request for the lifecycle of the containerized VNF.

Specifically, the NFVO checks a composition view of a network service (network service, NS) to which the containerized VNF belongs. If a VNF instance or a nested NS instance that has a dependency relationship with the containerized VNF instance is in a normal state, creation of the containerized VNF instance does not affect a running status of the VNF instance or the nested NS instance that has the dependency relationship with the containerized VNF instance, and the NFVO allows the operation permission request.

Optionally, the NFVO may alternatively check a resource view of an NS to which the containerized VNF belongs. If there is an available container resource in a node resource pool of a container resource, the NFVO allows the operation permission request.

204: The NFVO returns, to the VNFM, a response message for the operation permission request.

The response message is used to indicate that the NFVO allows or rejects an operation requested by the operation permission request for the specified containerized VNF.

Optionally, if the NFVO needs to adjust the lifecycle management policy that is of the containerized VNF instance and that is carried in the operation permission request, the NFVO adds an adjusted lifecycle management policy for the containerized VNF instance to the response message.

205: The VNFM generates, according to the lifecycle management policy for the specified containerized VNF, a management policy for a container service of the specified containerized VNF, and sends a creation request for a container service to the CaaS manager. The creation request carries the management policy for the container service.

Accordingly, the CaaS manager receives the creation request from the VNFM, and obtains the management policy for the container service from the creation request.

In this embodiment of this application, for ease of differentiation, the lifecycle management policy for the container service is referred to as a first management policy, and the lifecycle management policy for the containerized VNF is referred to as a second management policy. For example, in step 201, the instantiation request for the containerized VNF carries the lifecycle management policy for the containerized VNF. In other words, the instantiation request for the containerized VNF carries the second management policy. In step 205, the VNFM generates, according to the lifecycle management policy for the containerized VNF, the management policy for the container service of the containerized VNF. In other words, the VNFM generates the first management policy according to the second management policy.

In other words, in this embodiment of this application, the second management policy is specific to the containerized VNF, and is used to manage the lifecycle of the containerized VNF. The first management policy is specific to the container service, and is used to manage a lifecycle of the container service.

It should be understood that the management policy for the container service (that is, the first management policy) is decomposition and mapping of the lifecycle management policy for the containerized VNF (that is, the second management policy) at a VNFC layer. For example, a corresponding scaling operation that is triggered and performed based on a threshold for performance metrics of the containerized VNF in the scaling operation is mapped as an operation of setting a threshold for monitoring metrics and calculating a step for a VNFC (a container application).

In addition, the creation request for the container service further carries a name and identification information of a specified container service.

In this embodiment of this application, a container service that constitutes the specified containerized VNF is referred to as a specified container service. In other words, the specified containerized VNF is mapped as the specified container service at the VNFC layer.

206: The CaaS manager interacts with a CaaS user plane, creates a replication controller (RC) and a pod (Pod) of the container service according to the management policy for the container service, loads an image of the container application in the pod, and activates the container service.

Step 206 is a process of creating the container service by the CaaS manager.

The management policy for the container service may be used as an input for creating the replication controller. For example, a size of a container service replica and a quantity of container service replicas are determined based on a capacity range and a step of the scaling operation.

Herein, the replication controller of the container service is used to manage a pod replica, to ensure that there are a specified quantity of pod replicas in a cluster. Generally, if a quantity of pod replicas in the cluster is greater than the specified quantity, an extra container is stopped. If a quantity of pod replicas in the cluster is less than the specified quantity, the replication controller of the container service starts several containers to ensure that there are the specified quantity of containers.

207: The CaaS manager returns a response message for the creation request to the VNFM.

208: The VNFM returns a response message for the containerized VNF instantiation request to the NFVO or the EM.

The embodiment shown in FIG. 5 is applicable to an application in which a conventional telecom network function, for example, an evolved packet core (evolved packet core, EPC) function, is migrated to a cloud through containerization. In this scenario, a containerized VNF and a non-containerized VNF (that is, a VM-based VNF) coexist in the central DC, and the containerized VNF and the VM-based VNF are centrally managed by the unified management entity VNFM at a VNF level.

According to the container service creation embodiment shown in FIG. 5, management for the lifecycle of the containerized VNF changes from central and on-demand management to distributed autonomous management. In other words, only VNF instantiation and VNF instance termination (for the VNF instance termination, refer to the following embodiment shown in FIG. 7) are retained in an on-demand operation on an interface of the NFV MANO system. Except that, all other processes of management for the lifecycle of the VNF are autonomously managed through interaction between the CaaS manager and the CaaS user plane.

Figure 6:
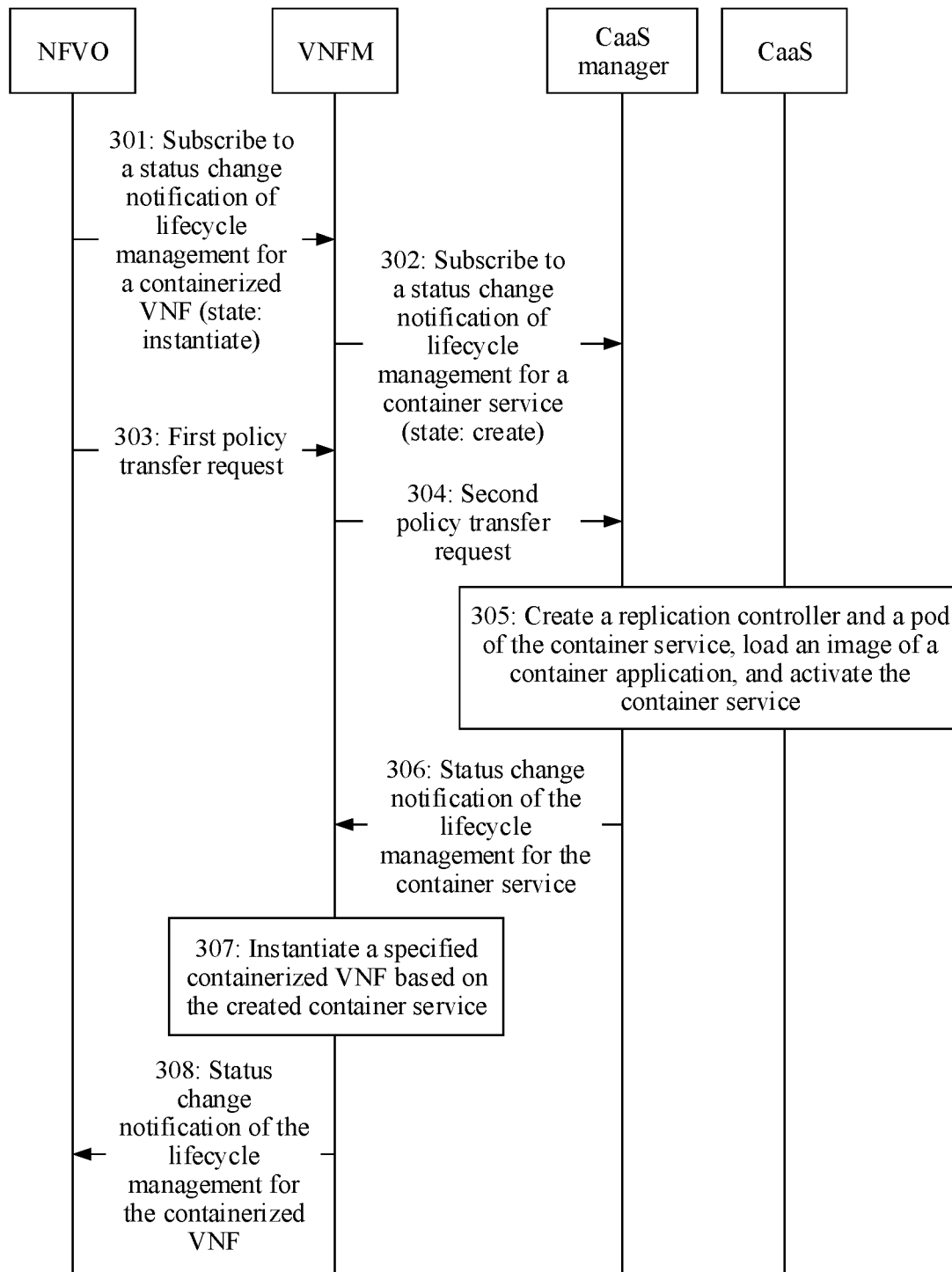
FIG. 6 shows another example of creating a container service by using a container service management method according to this application.

The following describes, with reference to FIG. 6, another method for creating a container service. In comparison with the method for creating a container service shown in FIG. 5, in the method for creating a container shown in FIG. 6, all management operations for a lifecycle of a containerized VNF are canceled on an interface of an NFV MANO system. A lifecycle management policy including VNF instantiation and VNF instance termination is mapped as a container service—based management policy, and the container service—based management policy is transferred to a CaaS manager and is autonomously managed through interaction between the CaaS manager and a CaaS user plane.

FIG. 6 shows another example of creating a container service by using a container service management method according to this application.

301: An NFVO or an EM subscribes a VNFM to a status change notification of lifecycle management for a containerized VNF.

The status change notification of the lifecycle management for the containerized VNF specifies that a subscribed state of the lifecycle management for the containerized VNF is "instantiate".

302: The VNFM subscribes a CaaS manager to a status change notification of lifecycle management for a container service.

The status change notification of the lifecycle management for the container service specifies that a subscribed state of the lifecycle management for the container service is "create".

303: The NFVO or the EM sends a first policy transfer request to the VNFM. The VNFM receives the first policy transfer request.

The first policy transfer request carries a management policy (namely, the second management policy described above) for a lifecycle of a specified containerized VNF.

304: The VNFM generates a first management policy according to the second management policy, and sends a second policy transfer request to the CaaS manager.

The second policy transfer request carries the first management policy. The first management policy is a management policy specific to a container service of the specified containerized VNF.

It should be understood that the "specified containerized VNF" in step 303 is constituted by a "specified container service" in step 304. In other words, the lifecycle management policy for the container service that constitutes the specified containerized VNF is generated according to the lifecycle management policy for the specified containerized VNF.

305: The CaaS manager creates a replication controller and a pod of the container service, loads an image of a container application, and activates the container service.

The first management policy may be used as an input for creating the replication controller. For example, a size of a container service replica and a quantity of container service replicas are determined based on a capacity range and a step of a scaling operation.

306: The CaaS manager sends the status change notification of the lifecycle management for the container service to the VNFM, to notify the VNFM of a newly created container service.

307: The VNFM instantiates the specified containerized VNF based on the newly created container service.

308: The VNFM sends the status change notification of the lifecycle management for the containerized VNF to the NFVO or the EM, to notify the NFVO or the EM of a newly created containerized VNF instance.

Figure 7:
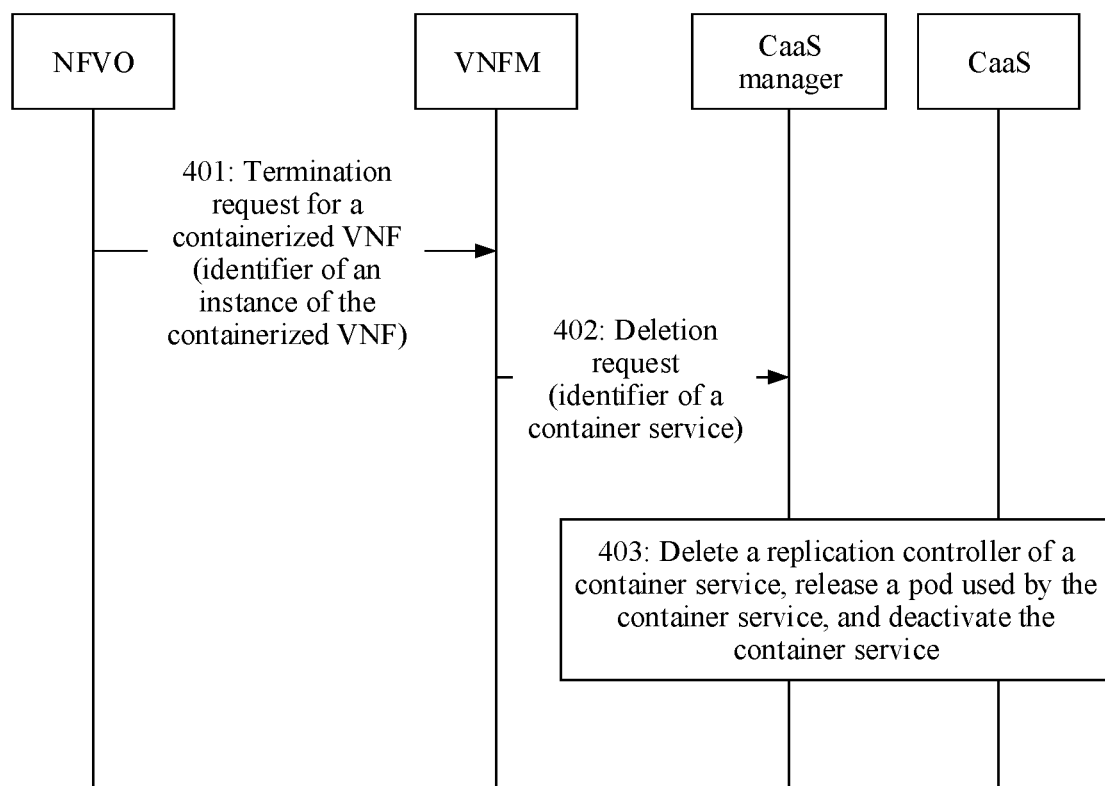
FIG. 7 shows an example of deleting a container service by using a container service management method according to this application.

FIG. 7 shows an example of deleting a container service by using a container service management method according to this application.

401: An NFVO or an EM sends a termination request for a containerized VNF to a VNFM. The VNFM receives the termination request for the containerized VNF from the NFVO or the EM.

The termination request for the containerized VNF is used to request to terminate an instance of a specified containerized VNF. The termination request carries an identifier of the instance of the specified containerized VNF.

402: The VNFM sends a deletion request for a specified container service to a CaaS manager based on the termination request for the containerized VNF.

The deletion request carries identification information of the specified container service.

403: The CaaS manager deletes a replication controller of the container service, releases a pod resource used by the container service, and deactivates the container service.

Step 403 is a process of deleting the container service by the CaaS manager, that is, a process of terminating a containerized VNF instance.

It can be learned that, similar to the process of creating the container service shown in FIG. 5, the process of deleting the container service shown in FIG. 7 is triggered by a VNF termination process initiated by the NFVO or the EM. Further, the VNFM initiates, to the CaaS manager, a process of deleting the container service that constitutes the VNF instance.

It is easy to understand that the deletion request for the container service is specific to an existing container service. In other words, it only makes sense to delete a container service that has been created. Therefore, the container service requested to be deleted in FIG. 7 may be a newly created container service in FIG. 5 or FIG. 6 or a container service that has been created earlier. This is not limited herein. If the container service requested to be deleted is the newly created container service shown in FIG. 5 or FIG. 6, the deletion request definitely exists after the creation request, and the deletion operation is an operation performed after the specified container service is created.

It should be noted that, in the container service creation embodiment provided in FIG. 6, all management operations (including the instantiation process of the containerized VNF shown in FIG. 5 and the termination process of the containerized VNF instance shown in FIG. 7) for the lifecycle of the containerized VNF are canceled on an interface (between the NFVO and the CaaS manager) of an NFV MANO system in an integrated architecture. Accordingly, a second management policy that is dispatched by the NFVO or the VNFM to the CaaS manager does not include a management policy for instantiating the containerized VNF, and/or the second management policy that is dispatched by the NFVO or the VNFM to the CaaS manager does not include a management policy for terminating the containerized VNF instance. It should be understood that, that the second management policy includes neither the management policy for instantiating the containerized VNF nor the management policy for terminating the containerized VNF instance means that the second management policy includes all operations for managing the entire lifecycle of the containerized VNF, except the management operations for instantiating and terminating the containerized VNF. For example, the second management policy includes auto scaling management, healing operation management, termination management, and the like for the containerized VNF.

The foregoing describes the integrated architecture applicable to the central DC and container service creation and deletion in the integrated architecture applicable to the central DC that are provided in this application. The following describes an integrated architecture applicable to an edge DC and container service creation and deletion in the integrated architecture applicable to the edge DC that are provided in this application. Creation of a container service may alternatively be understood as an instantiation process of the container service. Deletion of a container service may alternatively be understood as a termination process of a container service instance. The instantiation process and the instance termination process are basic lifecycle management processes. For details, refer to instantiation and termination processes of a VNF or an NS in the ETSI NFV standard.

2. Integrated Architecture Applicable to an Edge DC

An NFV MANO system is usually not deployed on an edge side of an operator network, for example, an edge data center (also referred to as an edge cloud). Instead, a lightweight mobile edge application (ME App) completes deployment of a container application and management for a lifecycle of a container service by using an autonomous container management system (for example, the Kubernetes system shown in FIG. 2). The NFV MANO system does not need to participate in the entire process. In view of this, this application provides an integrated architecture applicable to the edge DC, as shown in FIG. 8.

Figure 8:
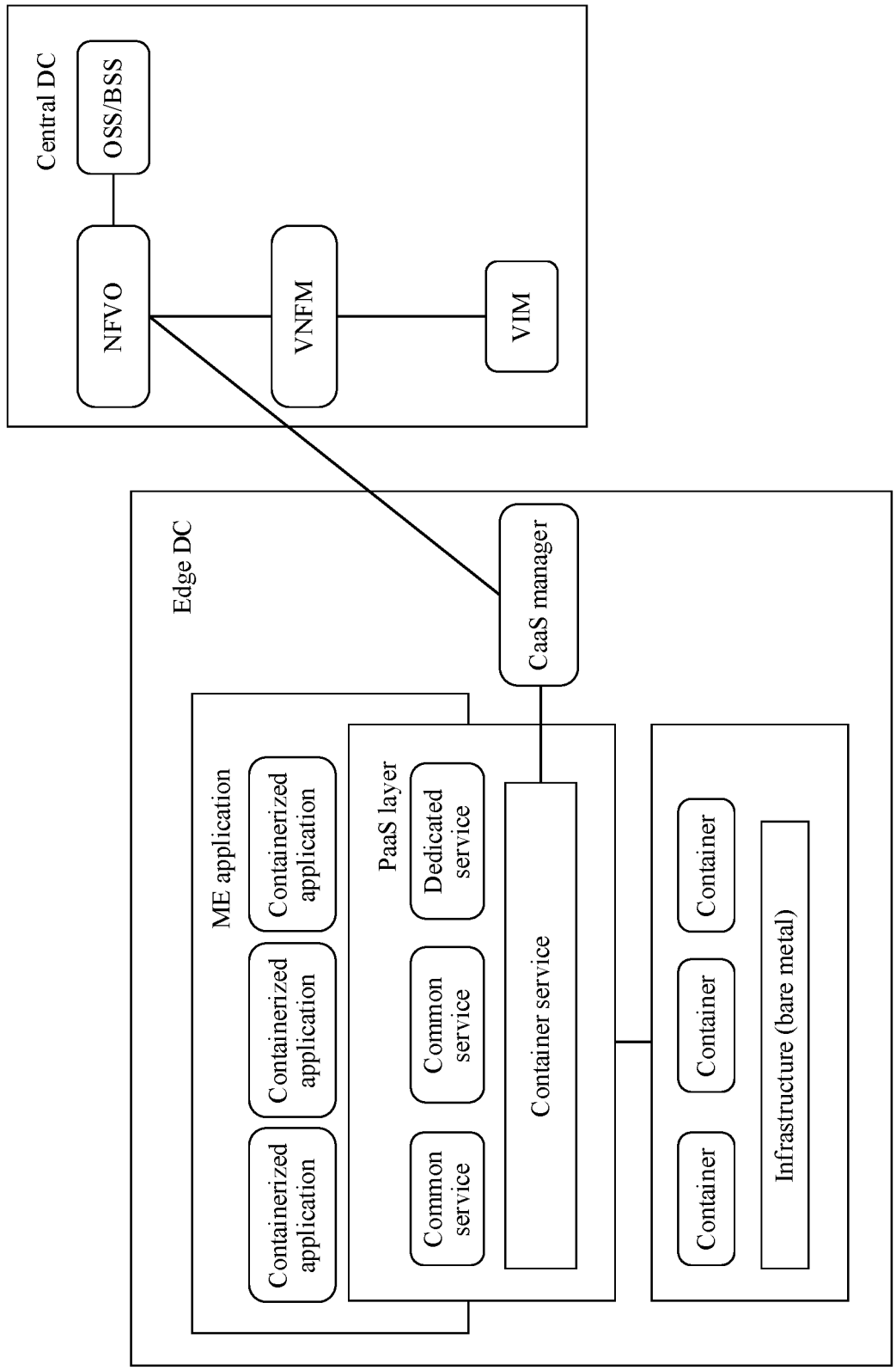
FIG. 8 is a schematic diagram of another network architecture according to this application.

FIG. 8 shows the integrated architecture applicable to the edge DC according to this application.

A CaaS manager is deployed in the edge DC. An NFV MANO system in a central DC and the CaaS manager are connected to each other through a wide area network (WAN) across the DCs. A container service in the edge DC is a special remote-end VNF, and is integrated into the NFV MANO system through an NFVO in the central DC. In other words, in the integrated architecture applicable to the edge DC, the NFVO is used as an anchor entity for the CaaS manager to access the NFV MANO system.

In addition, in the integrated architecture shown in FIG. 8, the CaaS manager may be a CaaS manager in an open-source Kubernetes system, or may be a mobile edge orchestrator (MEO). The MEO is a unified egress of a mobile edge management and orchestration function, and complies with a definition in the group specification (GS) of European telecommunications standards institute (ETSI) mobile edge computing (MEC) 003. MEC may alternatively be understood as multi-access edge computing, is an extension of the mobile edge computing by the ETSI, and includes various types of edge computing of edge networks such as a cellular mobile network, a fixed network, and Wi-Fi.

Figure 9:
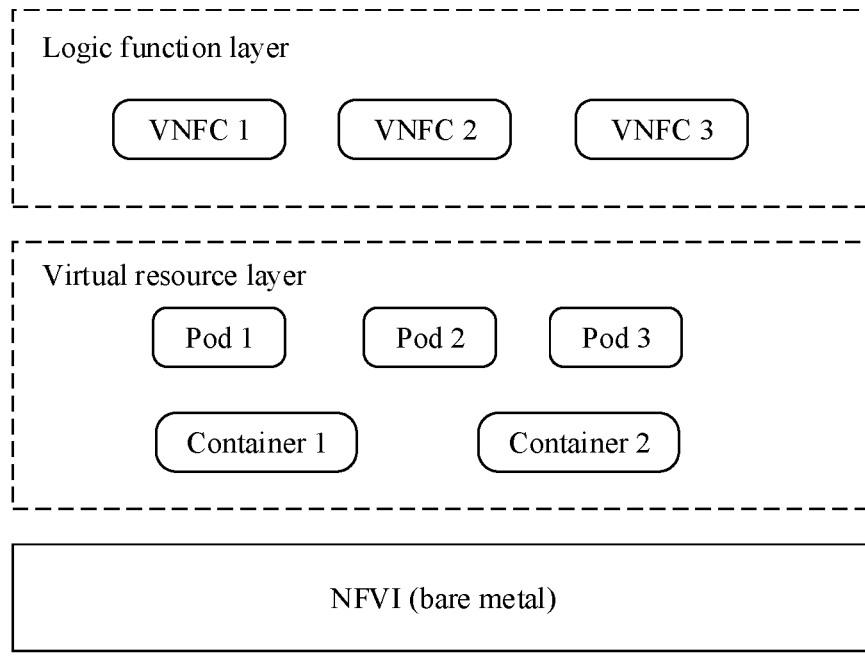
FIG. 9 shows composition of a containerized mobile edge application according to this application.

FIG. 9 shows composition of a containerized mobile edge application according to this application. Similar to the containerized VNF shown in FIG. 4, the containerized mobile edge application (that is, the ME App) also includes a logical function layer, a virtual resource layer, and an NFVI layer. At the logical function layer, one mobile edge application may be mapped as one VNF in an NFV MANO system, and may also be mapped as one container application on a container management platform. At the virtual resource layer, one mobile edge application may be further mapped as one pod (Pod) resource or one container (Container) resource.

The following describes how to create and delete a container service in the integrated architecture applicable to the edge DC.

Figure 10:
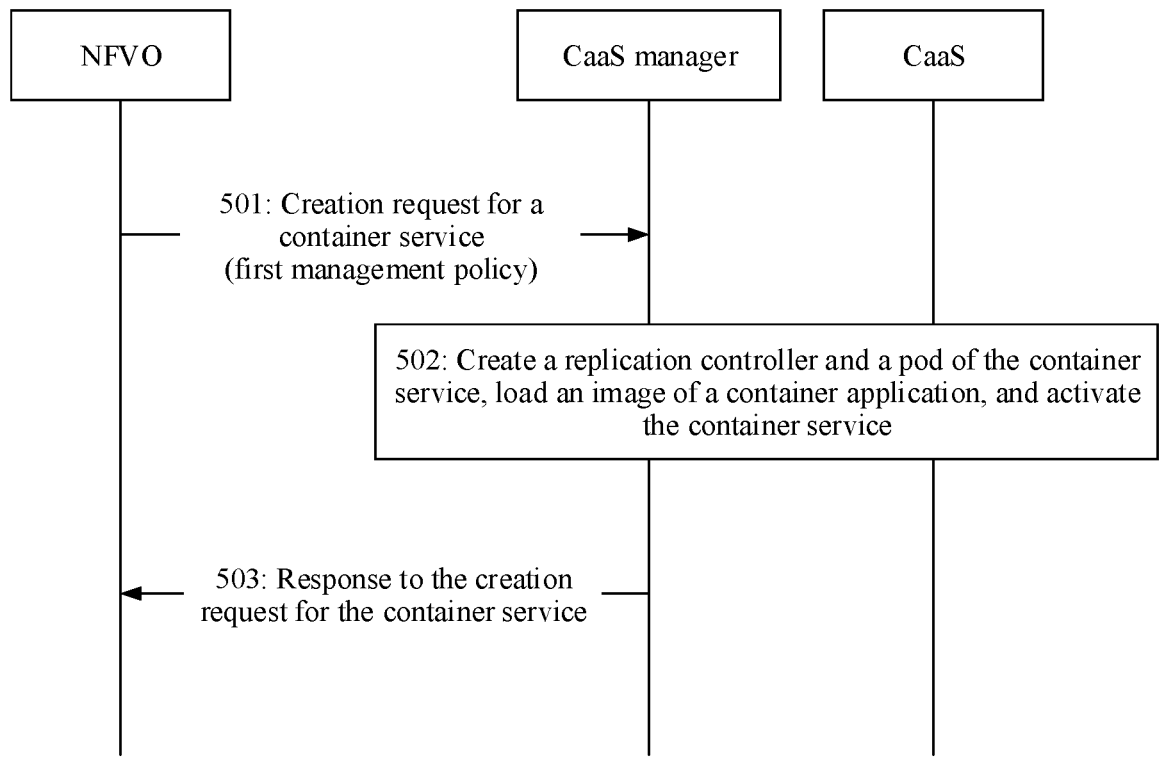
FIG. 10 shows an example of creating a container service by using a container service management method according to this application.

FIG. 10 shows an example of creating a container service by using a container service management method according to this application.

501: An NFVO sends a creation request for a container service to a CaaS manager. The CaaS manager receives the creation request from the NFVO.

The creation request carries identification information and a name of the container service that the NFVO requests to create, and a first management policy for managing a lifecycle of the container service.

The creation request for the container service that is sent by the NFVO to the CaaS manager may be triggered as follows: The NFVO parses a management requirement for a lifecycle of a network service (NS) managed by the NFVO, and determines that the container service needs to be created in an edge DC.

It should be noted that, for descriptions about the first management policy in the embodiment of the integrated architecture applicable to the edge DC, refer to the descriptions about the first management policy in the embodiments of the integrated architecture applicable to the central DC. All descriptions about the first management policy in the embodiments of the integrated architecture applicable to the central DC are applicable to the embodiments of the integrated architecture applicable to the edge DC.

502: The CaaS manager creates a replication controller and a pod of the container service, loads an image of a container application, and activates the container service.

The first management policy may be used as an input for creating the replication controller. For example, the CaaS manager determines a size of a container service replica and a quantity of container service replicas based on a capacity range and a step of a scaling operation.

503: The CaaS manager returns, to the NFVO, a response to the creation request for the container service.

Figure 11:
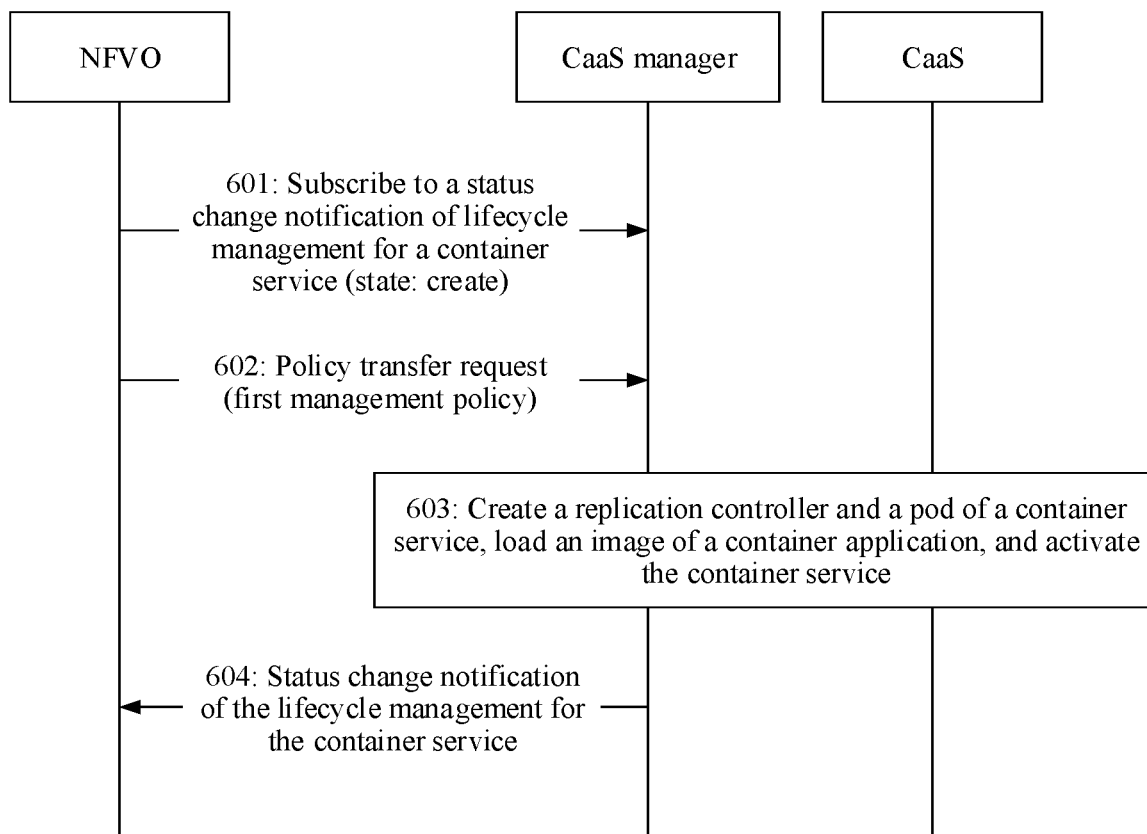
FIG. 11 shows another example of creating a container service by using a container service management method according to this application.

The following further describes, with reference to FIG. 11, another method for creating a container service according to this application.

FIG. 11 shows another example of creating a container service by using a container service management method according to this application.

601: An NFVO subscribes a CaaS manager to a status change notification of lifecycle management for a container service.

The status change notification of the lifecycle management for the container service specifies that a subscribed state of the lifecycle management for the container service is "create".

602: The NFVO sends a policy transfer request to the CaaS manager, where the policy transfer request carries a first management policy for the container service.

603: The CaaS manager creates a replication controller and a pod of the container service, loads an image of a container application, and activates the container service.

604: The CaaS manager returns the status change notification of the lifecycle management for the container service to the NFVO.

The status change notification of the lifecycle management for the container service is used to notify the NFVO of a newly created container service.

In the container service creation embodiment shown in FIG. 11, all management operations for the container service are canceled on an interface (between the NFVO and the CaaS manager) of an NFV MANO system. The NFVO transfers, to the CaaS manager, the first management policy for managing the lifecycle of the container service, where the first management policy includes creation and deletion of the container service. The CaaS manager parses a lifecycle management policy for a VNF through autonomous interaction between the CaaS manager and a CaaS user plane, and generates the first management policy for managing the lifecycle of the container service.

Figure 12:
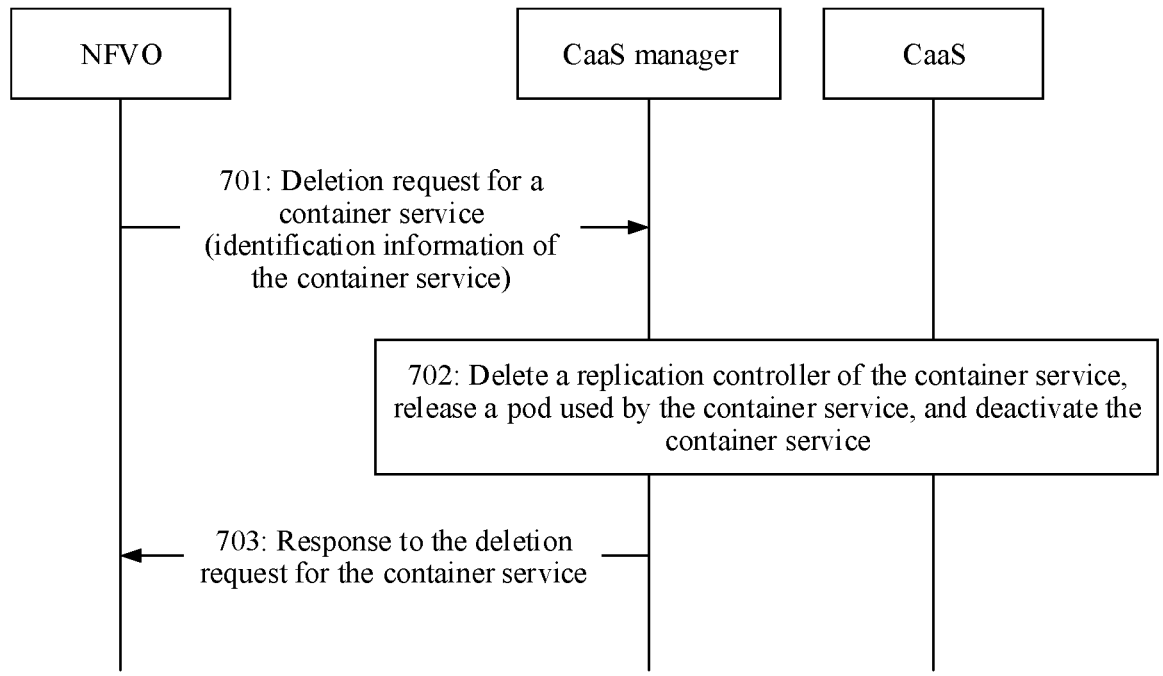
FIG. 12 shows an example of deleting a container service by using a container service management method according to this application.

The following describes, with reference to FIG. 12, a process of deleting a container service in the integrated architecture applicable to the edge DC.

FIG. 12 shows an example of deleting a container service by using a container service management method according to this application.

701: An NFVO sends a deletion request for a container service to a CaaS manager. The CaaS manager receives the deletion request for the container service from the NFVO.

The deletion request is used to request to delete a specified container service. The deletion request carries identification information of the specified container service.

702: The CaaS manager deletes a replication controller of the container service, releases a pod used by the container service, and deactivates the container service.

703: The CaaS manager sends, to the NFVO, a response to the deletion request for the container service.

It can be learned that, in the integrated architecture applicable to the edge DC, the NFVO is used as an anchor entity for the CaaS manager to access an NFV MANO system. The NFVO in the NFV MANO system may generate a first management policy for the container service, and directly dispatch the first management policy to the CaaS manager for execution, without participation of a VNFM.

With reference to the foregoing container service creation and deletion operations and/or procedures performed by the NFVO in the integrated architecture applicable to the central DC, it can be learned that in the integrated architecture applicable to the central DC, the NFVO first generates the second management policy for managing the lifecycle of the containerized VNF, and transfers the second management policy to the VNFM. Then, the VNFM generates, according to the second management policy, the first management policy for the container service that constitutes the containerized VNF, and dispatches the first management policy to the CaaS manager for execution. In other words, operations and/or procedures performed by the NFVO in different integrated architectures may relate to two cases. In one case, the NFVO generates the second management policy and sends the second management policy to the VNFM. This case is applicable to the integrated architecture applicable to the central DC. In the other case, the NFVO generates the first management policy, and directly dispatches the first management policy to the CaaS manager for execution. This case is applicable to the integrated architecture applicable to the edge DC.

The NFVO can learn whether a container service and a container service management function are deployed in the central data center or the edge data center. For example, during networking, the NFVO can learn of deployment of the container service and the container service management function, where the deployment includes whether the container service and the container service management function are specifically deployed in the central DC or the edge DC. Therefore, in the case of the edge data center, when the NFVO manages the container service, the NFVO directly generates the first management policy for the container service, and dispatches the first management policy to the CaaS manager, deployed in the edge data center, for execution. In the case of the central data center, the NFVO generates the second management policy for the containerized VNF, and dispatches the second management policy to the VNFM. The VNFM parses the second management policy, generates the management policy for the container service, and dispatches the management policy to the CaaS manager, deployed in the central data center, for execution.

Correspondingly, in the integrated architecture applicable to the central DC, the VNFM receives the second management policy from the NFVO, generates the first management policy according to the second management policy, and then sends the second management policy to the CaaS manager for execution. In the integrated architecture applicable to the edge DC, the NFVO is used as the anchor entity for the CaaS manager to access the NFV MANO system, and the VNFM does not participate in the creation and deletion processes of the container service.

The foregoing describes, with reference to FIG. 1 to FIG. 12, the integrated architecture applicable to the central DC and the integrated architecture applicable to the edge DC that are provided in this application, and describes in detail the creation and deletion processes of the container service in each architecture.

It should be noted that, according to the lifecycle management policy (that is, the first management policy described above) for the container service, other operations for managing the lifecycle of the container service such as scaling and healing operations can be autonomously completed through interaction between the CaaS manager and the CaaS user plane. Because all these operations do not require participation of the NFV MANO system, a process of interaction between the CaaS manager and the anchor entity that accesses the NFV MANO system is not related. Therefore, these operation processes are not described in this specification. For the other operations for managing the lifecycle of the container service that are autonomously completed through interaction between the CaaS manager and the CaaS user plane, refer to a management process of an existing container service management system, for example, refer to a management process of the existing Kubernetes system.

In the architectures, provided in this application, (including the integrated architecture applicable to the central DC and the integrated architecture applicable to the edge DC) integrating the NFV MANO system and the container service management system, a container service management function uses the VNFM or the NFVO as an anchor entity to access the NFV MANO system. Operations for managing the container service can be completed through interaction between the anchor entity and the CaaS manager. The lifecycle of the container application can be autonomously managed through interaction between the CaaS manager and the CaaS user plane. Existing features for container resource management can remain unchanged, and NFVO-centric monitoring functions of entities above the anchor entity in the NFV MANO system basically remains unchanged. In this way, the container service management function can be smoothly integrated into the NFV MANO system.

The foregoing describes the container service management method provided in this application in detail with reference to FIG. 1 to FIG. 12. The following describes a container service management apparatus provided in this application.

Figure 13:
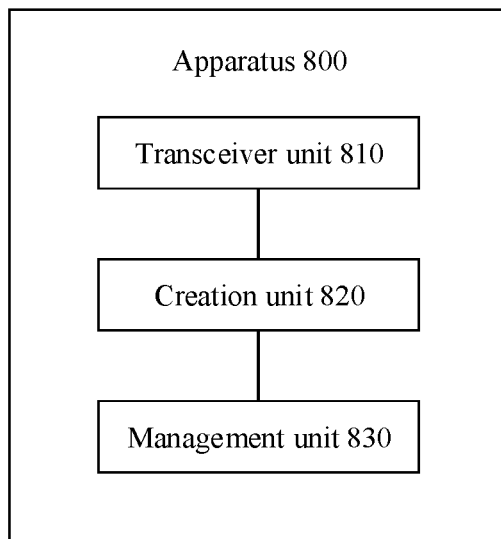
FIG. 13 is a schematic block diagram of a container service management apparatus 800 that is applicable to an embodiment of this application.

FIG. 13 is a schematic block diagram of a container service management apparatus 800 according to an embodiment of this application. As shown in FIG. 13, the apparatus 800 includes a transceiver unit 810, a creation unit 820, and a management unit 830.

The transceiver unit 810 is configured to receive a creation request for a container service, where the creation request is used to request to create a specified container service, and the creation request carries a first management policy for managing a lifecycle of the specified container service.

The creation unit 820 is configured to create the specified container service in response to the creation request received by the transceiver unit.

The management unit 830 is configured to manage, according to the first management policy, the lifecycle of the container service created by the creation unit 820.

Optionally, the transceiver unit 810 is further configured to receive a deletion request for a container service, where the deletion request is used to request to delete the specified container service, and the deletion request carries identification information of the specified container service. The management unit 830 is further configured to delete, according to the first management policy, the specified container service created by the creation unit 820.

Specifically, when a container service management function is deployed in a central data center, the transceiver unit 810 is configured to receive the creation request from a virtualised network function manager VNFM, and receive the deletion request from the VNFM. Specifically, when a container service management function is deployed in an edge data center, the transceiver unit 810 is configured to receive the creation request from a network functions virtualisation orchestrator NFVO, and receive the deletion request from the NFVO.

In addition, in this embodiment of this application, container service management includes management for a lifecycle of a container application and management for a container resource that constitutes a container service. The management unit 830 is configured to manage, according to the first management policy, the lifecycle of the container application and a container resource that constitutes the specified container service.

In this embodiment of this application, the lifecycle of the container application and the container resource are managed by the apparatus 800.

Optionally, the apparatus 800 may be the CaaS manager in the foregoing embodiments, or a chip installed in a network device. The chip has a function of performing a corresponding operation and/or procedure performed by the CaaS manager in the foregoing method embodiments. For example, for a scenario in an integrated architecture applicable to the central data center, refer to the CaaS manager shown in FIG. 5 to FIG. 7. For a scenario in an integrated architecture applicable to the edge data center, refer to the CaaS manager shown in FIG. 10 to FIG. 12.

Figure 14:
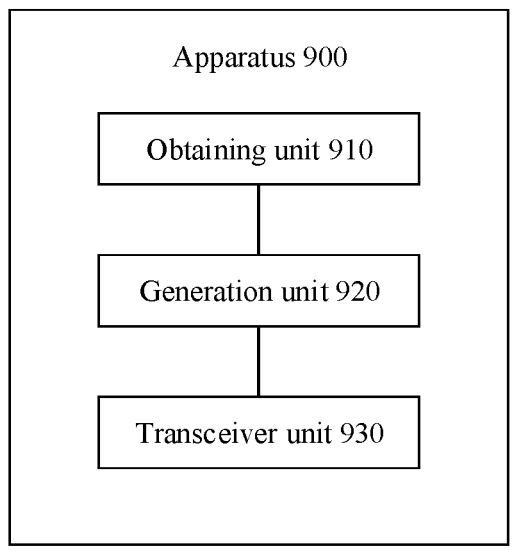
FIG. 14 is a schematic block diagram of a container service management apparatus 900 that is applicable to an embodiment of this application.

FIG. 14 is a schematic block diagram of a container service management apparatus 900 according to an embodiment of this application. As shown in FIG. 14, the apparatus 900 includes an obtaining unit 910, a generation unit 920, and a transceiver unit 930.

The obtaining unit 910 is configured to obtain a second management policy for managing a lifecycle of a specified containerized VNF.

The generation unit 920 is configured to generate, according to the second management policy obtained by the obtaining unit 910, a first management policy for managing a lifecycle of a specified container service. The specified containerized VNF is constituted by the specified container service.

The transceiver unit 930 is configured to send the first management policy generated by the generation unit 920 to a container service management entity.

Optionally, the second management policy does not include a management policy for instantiating a containerized VNF, and the transceiver unit 930 is specifically configured to: receive an instantiation request for a containerized VNF from a network functions virtualisation orchestrator NFVO or an element management EM system, and the obtaining unit 910 obtains the second management policy from the instantiation request. The instantiation request is used to request to instantiate the specified containerized VNF, and the instantiation request carries the second management policy.

Optionally, the second management policy does not include a management policy for terminating a containerized VNF instance, and the transceiver unit 930 is specifically configured to receive a termination request for a containerized VNF instance from the NFVO, where the termination request is used to request to terminate an instance of the specified containerized VNF, and the termination request carries identification information of the instance of the specified containerized VNF. The transceiver unit 810 is further configured to send a deletion request for a container service to the container service management entity in response to the termination request.

Optionally, the apparatus 900 may be the VNFM in the foregoing method embodiments, or a chip installed in a network device. The chip has a function of performing a corresponding operation and/or procedure performed by the VNFM (for example, the VNFM shown in FIG. 5 to FIG. 7) in the foregoing method embodiments.

Figure 15:
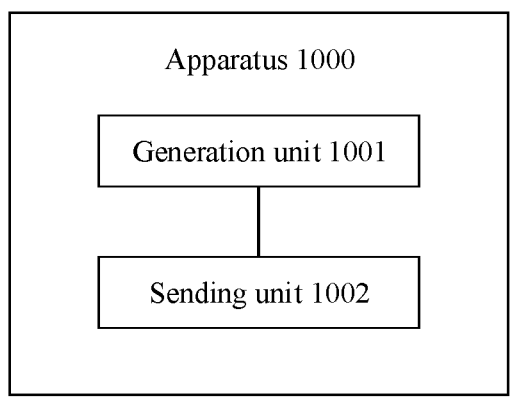
FIG. 15 is a schematic block diagram of a container service management apparatus 1000 that is applicable to an embodiment of this application.

FIG. 15 is a schematic block diagram of a container service management apparatus 1000 according to an embodiment of this application.

A generation unit 1001 is configured to generate a first management policy for managing a lifecycle of a specified container service, or generate a second management policy for managing a lifecycle of a specified containerized virtualised network function VNF, where the specified containerized VNF is constituted by the specified container service.

A transceiver unit 1002 is configured to send the first management policy to a container service management entity when the generation unit 1001 generates the first management policy.

Alternatively, the transceiver unit 1002 is configured to send the second management policy to a virtualised network function manager VNFM when the generation unit 1001 generates the second management policy.

Optionally, the transceiver unit 1002 is configured to send a creation request for a container service to the container service management entity, where the creation request carries the first management policy.

Optionally, the transceiver unit 1002 is further configured to send a deletion request for a container service to the container service management entity, where the deletion request is used to request to delete the specified container service, and the deletion request carries identification information of the specified container service.

Specifically, when the apparatus 1000 for managing a container service generates the second management policy, if the second management policy does not include a management policy for instantiating a containerized VNF, the transceiver unit 1002 is configured to send an instantiation request for a containerized VNF to the VNFM, where the instantiation request is used to request to instantiate the specified containerized VNF, and the instantiation request carries the second management policy.

If the second management policy does not include a management policy for terminating a containerized VNF instance, the transceiver unit 1002 is configured to send a termination request for a containerized VNF instance to the VNFM, where the termination request is used to request to terminate an instance of the specified containerized VNF, and the termination request carries identification information of the instance of the specified containerized VNF.

The case in which the NFVO generates the second management policy is applicable to a scenario in which a container service and a container service management function are deployed in a central data center. The case in which the NFVO generates the first management policy is applicable to a scenario in which a container service and a container service management function are deployed in an edge data center.

Optionally, the apparatus 1000 may be the NFVO in the foregoing method embodiments, or a chip installed in a network device. The chip has a function of performing a corresponding operation and/or procedure performed by the NFVO in the foregoing method embodiments. For example, for a scenario in an integrated architecture applicable to the central data center, refer to the NFVO shown in FIG. 5 to FIG. 7. For a scenario in an integrated architecture applicable to the edge data center, refer to the NFVO shown in FIG. 10 to FIG. 12.

Figure 16:
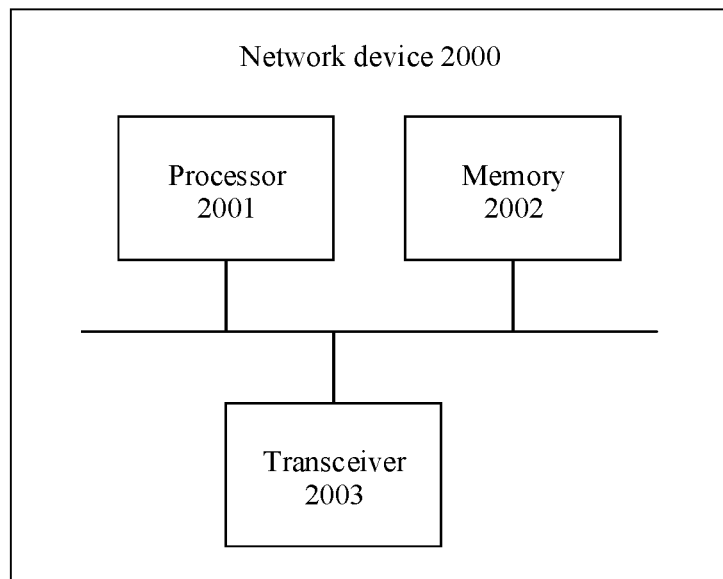
FIG. 16 is a schematic block diagram of a network device 2000, for managing a container service, that is applicable to an embodiment of this application.

FIG. 16 is a schematic structural diagram of a network device 2000 for managing a container service according to an embodiment of this application. As shown in FIG. 16, the network device 2000 includes one or more processors 2001, one or more memories 2002, and one or more transceivers 2003. The processor 2001 is configured to control the transceiver 2003 to send and receive a signal. The memory 2002 is configured to store a computer program. The processor 2001 is configured to invoke the computer program from the memory 2002 and run the computer program, so that the network device 2000 performs a corresponding procedure and/or operation performed by the CaaS manager in the container service management method in this application. For example, when the network device 2000 is deployed in a central data center, the network device 2000 performs a corresponding procedure and/or operation performed by the CaaS manager in FIG. 5 to FIG. 7. When the network device 2000 is deployed in an edge data center, the network device 2000 performs a corresponding procedure and/or operation performed by the CaaS manager in FIG. 10 to FIG. 12.

Figure 17:
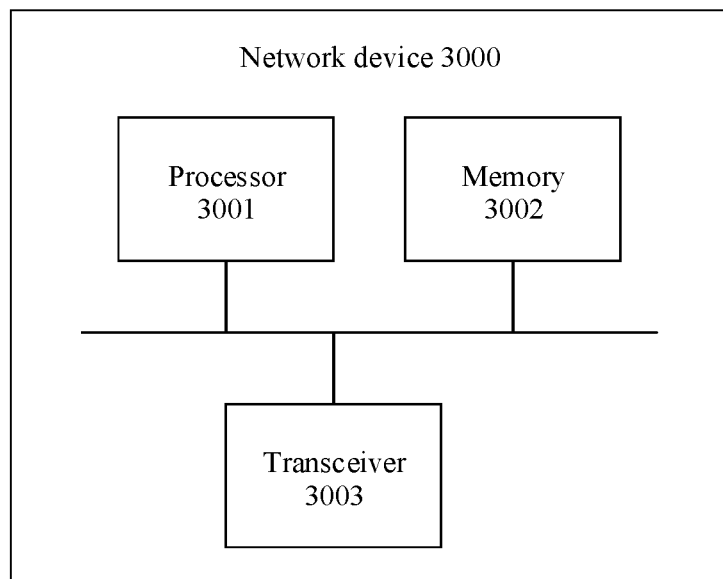
FIG. 17 is a schematic block diagram of a network device 3000, for managing a container service, that is applicable to an embodiment of this application.

FIG. 17 is a schematic structural diagram of a network device 3000 for managing a container service according to an embodiment of this application. As shown in FIG. 17, the network device 3000 includes one or more processors 3001, one or more memories 3002, and one or more transceivers 3003. The processor 3001 is configured to control the transceiver 3003 to send and receive a signal. The memory 3002 is configured to store a computer program. The processor 3001 is configured to invoke the computer program from the memory 3002 and run the computer program, so that the network device 3000 performs a corresponding procedure and/or operation performed by the VNFM in the container service management method in this application. For example, the network device 3000 performs a corresponding procedure and/or operation performed by the VNFM in FIG. 5 to FIG. 7.

Figure 18:
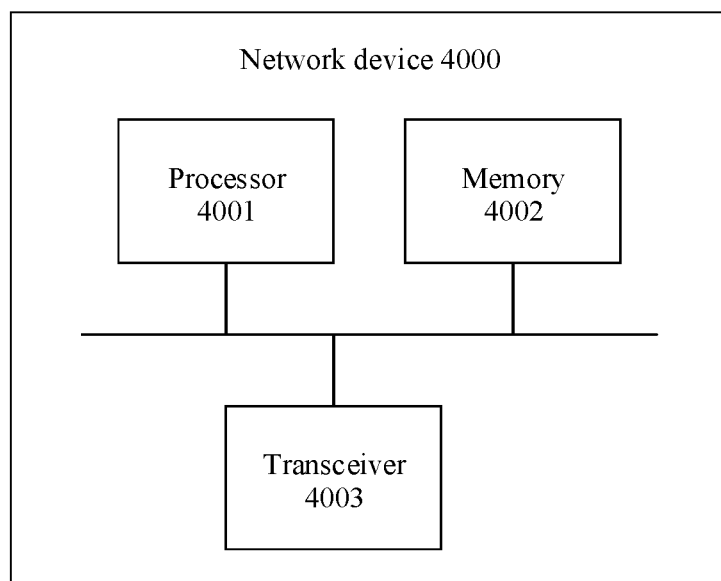
FIG. 18 is a schematic block diagram of a network device 4000, for managing a container service, that is applicable to an embodiment of this application.

FIG. 18 is a schematic structural diagram of a network device 4000 for managing a container service according to an embodiment of this application. As shown in FIG. 9, the network device 4000 includes one or more processors 4001, one or more memories 4002, and one or more transceivers 4003. The processor 4001 is configured to control the transceiver 4003 to send and receive a signal. The memory 4002 is configured to store a computer program. The processor 4001 is configured to invoke the computer program from the memory 4002 and run the computer program, so that the network device 4000 performs a corresponding procedure and/or operation performed by the NFVO in the container service management method in this application. For example, the network device 4000 performs a corresponding procedure and/or operation performed by the NFVO in FIG. 5 to FIG. 7 or FIG. 10 to FIG. 12.

In addition, this application further provides a computer-readable storage medium. The computer-readable storage medium stores a computer instruction. When the computer instruction is run on a computer, the computer is enabled to perform a corresponding procedure and/or operation performed by the CaaS manager in the container service management method embodiments.

This application further provides a computer-readable storage medium. The computer-readable storage medium stores a computer instruction. When the computer instruction is run on a computer, the computer is enabled to perform a corresponding procedure and/or operation performed by the VNFM in the container service management method embodiments.

This application further provides a computer-readable storage medium. The computer-readable storage medium stores a computer instruction. When the computer instruction is run on a computer, the computer is enabled to perform a corresponding procedure and/or operation performed by the NFVO in the container service management method embodiments.

In addition, this application further provides a chip, including a memory and a processor. The memory is configured to store a computer program, and the processor is configured to invoke the computer program from the memory and run the computer program, so that a network device in which the chip is installed performs a corresponding procedure and/or operation performed by the CaaS manager in the container service management method embodiments.

This application further provides a chip, including a memory and a processor. The memory is configured to store a computer program, and the processor is configured to invoke the computer program from the memory and run the computer program, so that a network device in which the chip is installed performs a corresponding procedure and/or operation performed by the VNFM in the container service management method embodiments.

This application further provides a chip, including a memory and a processor. The memory is configured to store a computer program, and the processor is configured to invoke the computer program from the memory and run the computer program, so that a network device in which the chip is installed performs a corresponding procedure and/or operation performed by the NFVO in the container service management method embodiments.

In addition, this application further provides a computer program product. The computer program product includes computer program code. When the computer program code is run on a computer, the computer is enabled to perform a corresponding procedure and/or operation performed by the CaaS manager in the container service management method embodiments.

This application further provides a computer program product. The computer program product includes computer program code. When the computer program code is run on a computer, the computer is enabled to perform a corresponding procedure and/or operation performed by the VNFM in the container service management method embodiments.

This application further provides a computer program product. The computer program product includes computer program code. When the computer program code is run on a computer, the computer is enabled to perform a corresponding procedure and/or operation performed by the NFVO in the container service management method embodiments.

In addition, this application further provides a container service management system. The system includes the CaaS manager, the VNFM, and/or the NFVO in the container service management method embodiments (for example, the embodiments shown in FIG. 5 to FIG. 7 and FIG. 10 to FIG. 12).

In the foregoing embodiments, "and/or" describes an association relationship between associated objects, and indicates that three relationships may exist. For example, A and/or B may represent a case in which only A exists, both A and B exist, and only B exists. A and B may be singular or plural.

In the foregoing embodiments, the processor may be a CPU, a microprocessor, an application-specific integrated circuit (ASIC), one or more integrated circuits configured to control program execution of the solution of this application, or the like. For example, the processor may include a digital signal processor device, a microprocessor device, an analog-to-digital converter, and a digital-to-analog converter. The processor may allocate control and signal processing functions of mobile devices between these devices based on respective functions of the devices. In addition, the processor may include functions for operating one or more software programs, and the software programs may be stored in a memory.

The functions of the processor may be implemented by hardware or may be implemented by hardware executing corresponding software. The hardware or the software includes one or more modules corresponding to the foregoing functions.

The memory may be a read-only memory (ROM), another type of static storage device capable of storing static information and instructions, a random access memory (RAM), or another type of dynamic storage device capable of storing information and instructions. The memory may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in a form of an instruction or a data structure and that can be accessed by a computer.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or a combination of computer software and electronic hardware depends on particular applications and design constraint conditions of the technical solutions. A person skilled in the art may use a different method to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or partially contribute to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application. A person skilled in the art may

What is claimed is:

1. A container service management method, wherein the method comprises:
subscribing, by a network functions virtualisation orchestrator (NFVO) in a network function virtualisation management and orchestration (NFV MANO) system architecture, to a status change notification of lifecycle management for a container service from a container as a service (CaaS) manager which manages a CaaS that uses a server platform function as a service;
after the subscribing, sending, by the NFVO, a policy transfer request to the CaaS manager, wherein the policy transfer request comprises a first management policy for a container service;
creating, by the CaaS manager, the container service according to the first management policy; and
sending, by the CaaS manager, a status change notification of lifecycle management for the created container service to the NFVO.

2. The method according to claim 1, wherein the creating the container service comprises:
creating, by the CaaS manager, a replication controller and a pod of the container service;
loading, by the CaaS manager, an image of a container application; and
activating, by the CaaS manager, the container service.

3. A container service management method, wherein the method comprises:
subscribing, by a network functions virtualisation orchestrator (NFVO) in a network function virtualisation management and orchestration (NFV MANO) system architecture, to a status change notification of lifecycle management for a container service from a container as a service (CaaS) manager which manages a CaaS that uses a server platform function as a service;
after the subscribing, sending, by the NFVO, a policy transfer request to the CaaS manager, wherein the policy transfer request comprises a first management policy for a container service, wherein the first management policy indicates creation of the container service;
receiving, by the NFVO, a status change notification of lifecycle management for a container service that corresponds to the first management policy and created by the CaaS manager, from the CaaS manager.

4. A communication system, comprising a network functions virtualisation orchestrator (NFVO) in a network function virtualisation management and orchestration (NFV MANO) system architecture and a container as a service (CaaS) manager which manages a CaaS that uses a server platform function as a service:
wherein the NFVO comprising: a transceiver; at least one processor; and one or more memories coupled to the at least one processor and storing programming instructions, which upon execution by the at least one processor causes the NFVO to:
subscribe to a status change notification of lifecycle management for a container service from a container as a service (CaaS) manager;
and thereafter, send a policy transfer request to the CaaS manager, wherein the policy transfer request comprises a first management policy for a container service; and
the CaaS manager comprising: a transceiver; at least one processor; and one or more memories coupled to the at least one processor and storing programming instructions, which upon execution by the at least one processor causes the CaaS manager to: create the container service according to the first management policy; and
send a status change notification of lifecycle management for the created container service to the NFVO.

5. The system according to claim 4, wherein the execution of the programming instructions causes the CaaS manager to: create a replication controller and a pod of the container service;
load an image of a container application; and
activate the container service.

6. A communication apparatus, implemented as a network functions virtualisation orchestrator in a network function virtualisation management and orchestration (NFV MANO) system architecture, comprising: a transceiver; at least one processor; and
one or more memories coupled to the at least one processor and storing programming instructions, which upon execution by the at least one processor causes the communication apparatus to:
subscribe to a status change notification of lifecycle management for a container service from a container as a service (CaaS) manager which manages a CaaS that uses a server platform function as a service;
and thereafter, send a policy transfer request to the CaaS manager, wherein the policy transfer request comprises a first management policy for a container service, wherein the first management policy indicates creation of the container service; and
receive a status change notification of lifecycle management for a container service that corresponds to the first management policy and created by the CaaS manager, from the CaaS manager.

* * * * *